US012695979B2

(12) United States Patent
Wang et al.

(10) Patent No.: US 12,695,979 B2
(45) Date of Patent: Jul. 28, 2026

(54) SHOOTING METHOD AND ELECTRONIC DEVICE

(71) Applicant: Honor Device Co., Ltd., Shenzhen (CN)

(72) Inventors: Rui Wang, Shenzhen (CN); Wenhan Feng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 105 days.

(21) Appl. No.: 18/695,434

(22) PCT Filed: Apr. 17, 2023

(86) PCT No.: PCT/CN2023/088623
§ 371 (c)(1),
(2) Date: Mar. 26, 2024

(87) PCT Pub. No.: WO2023/231616
PCT Pub. Date: Dec. 7, 2023

(65) Prior Publication Data
US 2024/0397196 A1 Nov. 28, 2024

(30) Foreign Application Priority Data
May 30, 2022 (CN) .......................... 202210603605.4
Jul. 29, 2022 (CN) .......................... 202210908497.1

(51) Int. Cl.
*H04N 23/63* (2023.01)
*H04N 23/57* (2023.01)
*H04N 23/611* (2023.01)
*H04N 23/67* (2023.01)

(52) U.S. Cl.
CPC ........... *H04N 23/632* (2023.01); *H04N 23/57* (2023.01); *H04N 23/611* (2023.01); *H04N 23/635* (2023.01); *H04N 23/675* (2023.01)

(58) Field of Classification Search
CPC .... H04N 23/632; H04N 23/57; H04N 23/611; H04N 23/635; H04N 23/675; H04N 5/772; H04N 23/631; H04M 1/72439
See application file for complete search history.

(56) References Cited

U.S. PATENT DOCUMENTS 8,891,821 B2    11/2014  Sato
11,765,463 B2    9/2023  Li et al.
(Continued)

FOREIGN PATENT DOCUMENTS

CN        102405483  A      4/2012
CN        106250863  A     12/2016
(Continued)

*Primary Examiner* — Yogesh K Aggarwal
(74) *Attorney, Agent, or Firm* — WOMBLE BOND DICKINSON (US) LLP

(57) ABSTRACT

This application provides a shooting method. By implementing the method, a terminal device such as a mobile phone or a tablet computer can determine a shot protagonist based on a user operation when starting shooting or in a shooting process. In the shooting process, the terminal device may display, in a preview window, an image stream collected by a camera, and the terminal device may further generate a small window that specially displays the protagonist. After recording ends, a user may obtain two videos: an original video generated based on the image stream in the preview window, and a close-up video generated based on a protagonist image stream in the small window.

20 Claims, 25 Drawing Sheets

(56) References Cited

U.S. PATENT DOCUMENTS

| | | | |
|---|---|---|---|
| 2012/0062732 A1 | 3/2012 | Marman et al. | |
| 2016/0241776 A1* | 8/2016 | Kim | G06V 40/161 |
| 2016/0259434 A1* | 9/2016 | Kato | G06F 3/1454 |
| 2018/0196472 A1* | 7/2018 | Lee | H04N 5/772 |
| 2018/0270445 A1 | 9/2018 | Khandelwal et al. | |
| 2023/0116044 A1 | 4/2023 | Han | |
| 2023/0230276 A1 | 7/2023 | Shen | |
| 2023/0396886 A1 | 12/2023 | Li et al. | |
| 2024/0406536 A1 | 12/2024 | Han et al. | |

FOREIGN PATENT DOCUMENTS

| | | | |
|---|---|---|---|
| CN | 110072070 A | 7/2019 | |
| CN | 110557566 A | 12/2019 | |
| CN | 110602408 A | 12/2019 | |
| CN | 112135046 A | 12/2020 | |
| CN | 112437232 A | 3/2021 | |
| CN | 112770050 A | 5/2021 | |
| CN | 112954218 A | 6/2021 | |
| CN | 112954219 A | 6/2021 | |
| CN | 113365013 A | 9/2021 | |
| CN | 113536866 A | 10/2021 | |
| CN | 113873166 A | 12/2021 | |
| CN | 114125179 A | 3/2022 | |
| CN | 114422692 A | 4/2022 | |
| EP | 1237374 A1 | 9/2002 | |
| EP | 4395353 A1 | 7/2024 | |
| JP | 2007150496 A | 6/2007 | |
| WO | 2020186969 A1 | 9/2020 | |
| WO | 2021175197 A1 | 9/2021 | |
| WO | 2022068537 A1 | 4/2022 | |

* cited by examiner

113

113

SHOOTING METHOD AND ELECTRONIC DEVICE

CROSS-REFERENCE TO RELATED APPLICATIONS

This application is a national stage of International Application No. PCT/CN2023/088623, filed on Apr. 17, 2023, which claims priority to Chinese Patent Application No. 202210603605.4, filed on May 30, 2022, and Chinese Patent Application No. 202210908497.1, filed on Jul. 29, 2022. The disclosures of each of the aforementioned applications are hereby incorporated by reference in their entireties.

TECHNICAL FIELD

This application relates to the terminal field, and in particular, to a shooting method and an electronic device.

BACKGROUND

To improve user experience, terminal devices such as a mobile phone and a tablet computer are usually configured with a plurality of cameras. A plurality of shooting modes are provided for photo and video functions, for example, a front-camera mode, a rear-camera mode, and a front-rear dual-camera mode. In an implementation, a user may record a video of one or more persons by using the terminal device. When the user wants to obtain a video of one of target persons, the user may perform manual clipping processing on the video. However, a manual clipping processing method is cumbersome, and a shooting user needs to have some video clipping skills. Consequently, user experience is poor.

SUMMARY

According to a first aspect, this application provides a shooting method, applied to an electronic device having a camera and a screen. The method includes: displaying a preview window on the screen, and displaying, in the preview window, an image collected by the camera, where the image displayed in the preview window includes one or more first objects; selecting a second object from the one or more first objects; further displaying a first window while displaying the preview window on the screen, where an image displayed in the first window includes the second object; and recording the image in the preview window, saving the image as a first video, recording the image in the first window, and saving the image as a second video.

By implementing the method according to the first aspect, the electronic device may identify the objects in the image collected by the camera, and select a focus tracking object from the objects, namely, a protagonist. Then, the electronic device may display another window on the screen, namely, the first window, to display a protagonist image. The electronic device may separately record and save the image in the preview window and the image in the first window. In this way, a user can shoot a raw image displayed in the preview window, and also automatically obtain a close-up image focusing on the protagonist.

By implementing the method according to the first aspect, in some embodiments, the selecting a second object from the one or more first objects includes displaying a selection box on the one or more first objects; and determining, in response to a user operation performed on a first selection box, the first object corresponding to the first selection box as the second object.

By implementing the method provided in the foregoing embodiment, the electronic device may display the selection box corresponding to each object after identifying the objects in the image. In this way, the user can determine, by using the selection box, each object identified by the electronic device, and select any one of the objects as a focus tracking object by using the selection box.

By implementing the method according to the first aspect, in some embodiments, after the displaying a selection box on the one or more first objects, the method further includes that the selection box disappears when no user operation performed on the screen is detected in first duration.

By implementing the method provided in the foregoing embodiment, the electronic device may detect an interaction event on the screen after displaying the selection box. If no interaction event acting on the screen is detected within a preset time, for example, within the first duration, the electronic device may hide the selection box. This can not only reduce blocking the image displayed on the screen by the selection box, but also reduce calculation costs required for image drawing, reducing power consumption.

By implementing the method according to the first aspect, in some embodiments, the second object is determined by the electronic device.

By implementing the method provided in the foregoing embodiment, the electronic device may also determine a focus tracking object from the identified objects. For example, an object evaluation rule may be preset in the electronic device. The electronic device may evaluate each identified object in the image according to the rule, and then determine an object with highest evaluation as a focus tracking object.

By implementing the method according to the first aspect, in some embodiments, a recording control is further displayed on the screen, and after the first window is displayed on the screen, the method further includes: receiving a recording operation of the user corresponding to the recording control, and starting recording the first video and the second video simultaneously, where a start recording moment of the first video is the same as a start recording moment of the second video.

By implementing the method provided in the foregoing embodiment, after determining the focus tracking object, the user may tap the recording control to control the electronic device to start recording. In this case, the screen includes the preview window and the first window. The electronic device may simultaneously start recording the image in the preview window and the image in the first window.

By implementing the method according to the first aspect, in some embodiments, a recording control is further displayed on the screen, and before the selecting a second object from the one or more first objects, the method further includes: receiving a recording operation of the user corresponding to the recording control, and starting recording the first video; and starting recording the second video while displaying the first window, where a start recording moment of the second video is later than a start recording moment of the first video.

By implementing the method provided in the foregoing embodiment, the user may first tap the recording control to start recording before selecting the focus tracking object. In this case, the screen includes the preview window without displaying the first window. The electronic device first records the image in the preview window. After the user determines the focus tracking object and the first window is displayed, the electronic device may automatically start recording the image in the first window.

By implementing the method according to the first aspect, in some embodiments, an end recording moment of the first video is the same as an end recording moment of the second video; or an end recording moment of the second video is earlier than an end recording moment of the first video.

By implementing the method provided in the foregoing embodiment, the user may first end recording the image in the first window, or may simultaneously end recording the images in the first window and the preview window.

By implementing the method according to the first aspect, in some embodiments, in a recording process, the method further includes: changing the second object from the one or more first objects, where the image displayed in the first window includes a changed second object.

By implementing the method provided in the foregoing embodiment, the user may switch the focus tracking object at any time in the recording process. After the focus tracking object is switched, the electronic device may focus track a newly selected focus tracking object, and display a close-up image of the newly selected focus tracking object in the first window.

By implementing the method according to the first aspect, in some embodiments, in the recording process, the method further includes: pausing recording of the image in the first window when it is detected that the image collected by the camera does not include the second object and duration is longer than second duration.

By implementing the method provided in the foregoing embodiment, when identifying that the image collected by the camera does not include a previously selected focus tracking object, the electronic device may start a timer. When timing of the timer ends and the protagonist is still not identified from the image collected by the camera, the image displayed in the first window may stay in a frame when the timer ends. In addition, the electronic device may pause recording of the image in the first window.

By implementing the method according to the first aspect, in some embodiments, in the recording process, the method further includes: pausing recording of the image in the first window when it is detected that the image collected by the camera does not include the second object.

By implementing the method provided in the foregoing embodiment, when it is identified that the image collected by the camera does not include a previously selected focus tracking object, the image displayed in the first window may stay at the last frame including the focus tracking object. In addition, the electronic device may pause recording of the image in the first window. That is, after being out of focus, the electronic device may immediately pause recording of the image in the first window. Because, in this case, the first window does not update the close-up image of the focus tracking object. In this way, when the protagonist disappears from a viewfinder range, the electronic device can automatically pause recording of the close-up image, to obtain a purer close-up video that includes only the protagonist.

By implementing the method according to the first aspect, in some embodiments, the method further includes: resuming recording the image in the first window when it is detected that the image collected by the camera includes the second object.

According to the method provided in the foregoing embodiment, after recording of the image in the first window is paused because of out-of-focus, if it is re-identified that the image collected by the camera includes the previously selected focus tracking object, the electronic device may further continue to display the close-up image of the focus tracking object in the first window, and resume recording the image in the first window. In this way, when the protagonist reappears in the viewfinder range, the electronic device can automatically continue to focus track the protagonist, and no user operation is required.

By implementing the method according to the first aspect, in some embodiments, the first window and the preview window are displayed in a split-screen manner, or the first window is displayed on the preview window but does not completely cover the preview window.

By implementing the method provided in the foregoing embodiment, in a video recording process, the user may simultaneously browse the raw image displayed in the preview window and the close-up image that includes the protagonist and that is displayed in the first window. Further, the user may adjust a location of the camera at any time, to shoot an original video and a close-up video that are more compatible with a personal requirement.

By implementing the method according to the first aspect, in some embodiments, the image that includes the second object and that is displayed in the first window is cropped based on the image displayed in the preview window.

By implementing the method according to the first aspect, in some embodiments, the electronic device includes a functional module, an object detection module, and a large-window control module, and the displaying a selection box on the one or more first objects includes: The object detection module identifies the one or more first objects from the image collected by the camera; the object detection module sends feature information of the one or more first objects to the functional module, where the feature information includes a center point indicating a location of the first object, and one first object corresponds to one group of feature information; the functional module determines display coordinates based on the center point in the feature information; and the large-window control module displays the selection box corresponding to the one or more first objects on the screen based on the display coordinates.

By implementing the method according to the first aspect, in some embodiments, that the selection box disappears when no user operation performed on the screen is detected in first duration includes: A functional module sets a first timer after the selection box is displayed, where timing duration of the first timer is the first duration; and a large-window control module cancels the selection box after timing of the first timer ends and the functional module detects no user operation performed on the screen.

By implementing the method according to the first aspect, in some embodiments, the electronic device further includes a focus tracking module and a small-window control module, and the displaying a first window includes: A functional module sends feature information of the second object to the focus tracking module; the focus tracking module determines, based on the feature information of the second object, whether an image to be sent for display includes the second object; the focus tracking module sends a focus tracking success indication to the functional module when the second object is included; and the functional module controls, based on the indication, the small-window control module to display the first window on the screen.

By implementing the method according to the first aspect, in some embodiments, the method further includes: When the second object is included, the focus tracking module crops the image displayed in the first window from the image to be sent for display.

By implementing the method according to the first aspect, in some embodiments, the electronic device further includes a start recording module, and the receiving a recording operation of the user corresponding to the recording control, and starting recording the first video and the second video simultaneously includes: The start recording module receives the recording operation of the user corresponding to the recording control; and the start recording module enables a first encoder and a second encoder in response to the recording operation, the first encoder starts encoding the image in the preview window, and the second encoder starts encoding the image in the first window.

By implementing the method according to the first aspect, in some embodiments, the electronic device further includes a pause recording module, and the pausing recording of the image in the first window when it is detected that the image collected by the camera does not include the second object and duration is longer than second duration includes: A focus tracking module sends an out-of-focus indication to a functional module when it is identified that an image to be sent for display does not include the second object, and the functional module sets a second timer based on the out-of-focus indication, where timing duration of the second timer is the second duration; and the pause recording module controls a second encoder to pause encoding of the image displayed in the first window when timing of the second timer ends and the functional module still does not receive a focus tracking success indication.

By implementing the method according to the first aspect, in some embodiments, the resuming recording the image in the first window when it is detected that the image collected by the camera includes the second object includes: A focus tracking module sends a focus tracking success indication to a functional module when it is identified that an image to be sent for display includes the second object; the functional module sends a resume recording indication to a start recording module based on the focus tracking success indication; and the start recording module re-enables a second encoder based on the resume recording indication, to continue to encode the image displayed in the first window.

By implementing the method according to the first aspect, in some embodiments, the method further includes: displaying a thumbnail of the first video and a thumbnail of the second video in a gallery, where the thumbnail of the second video includes the second object, the thumbnail of the second video also includes the first object, and image content of the first object in the thumbnail of the second video is consistent with image content of the first object in the thumbnail of the first video.

By implementing the method provided in the foregoing embodiment, the electronic device may separately display, in a gallery application, the first video obtained by recording the image in the preview window and the second video obtained by recording the first window. In this way, the user can freely choose to browse the first video or the second video.

By implementing the method according to the first aspect, in some embodiments, the thumbnail of the first video is displayed adjacent to the thumbnail of the second video.

By implementing the method provided in the foregoing embodiment, the first video and the second video that are simultaneously recorded may be displayed adjacent to each other. The user can clearly and intuitively obtain the first video and the second video that are simultaneously recorded.

By implementing the method according to the first aspect, in some embodiments, the camera includes a first camera and a second camera, an image collected by the first camera is displayed in the preview window, and a second image is collected by the second camera by focusing on the second object.

By implementing the method provided in the foregoing embodiment, the electronic device may alternatively focus track the protagonist by using different cameras, to obtain a close-up image that is different from content of the protagonist image displayed in the preview window.

According to a second aspect, this application provides an electronic device. The electronic device includes one or more processors and one or more memories. The one or more memories are coupled to the one or more processors, the one or more memories are configured to store computer program code, the computer program code includes computer instructions, and when the one or more processors execute the computer instructions, the electronic device is enabled to perform the method according to any one of the first aspect and the possible implementations of the first aspect.

According to a third aspect, an embodiment of this application provides a chip system, and the chip system is applied to an electronic device. The chip system includes one or more processors, and the one or more processors are configured to invoke computer instructions, so that the electronic device performs the method according to any one of the first aspect and the possible implementations of the first aspect.

According to a fourth aspect, this application provides a computer-readable storage medium, including instructions. When the instructions are run on an electronic device, the electronic device is enabled to perform the method according to any one of the first aspect and the possible implementations of the first aspect.

According to a fifth aspect, this application provides a computer program product including instructions. When the computer program product runs on an electronic device, the electronic device is enabled to perform the method according to any one of the first aspect and the possible implementations of the first aspect.

It may be understood that the electronic device according to the second aspect, the chip system according to the third aspect, the computer storage medium according to the fourth aspect, and the computer program product according to the fifth aspect are all used to perform the method provided in this application. Therefore, for beneficial effects that can be achieved by the electronic device, the chip system, the computer-readable storage medium, and the computer program product, refer to the beneficial effects in the corresponding method. Details are not described herein.

DESCRIPTION OF EMBODIMENTS

Figure 1A:
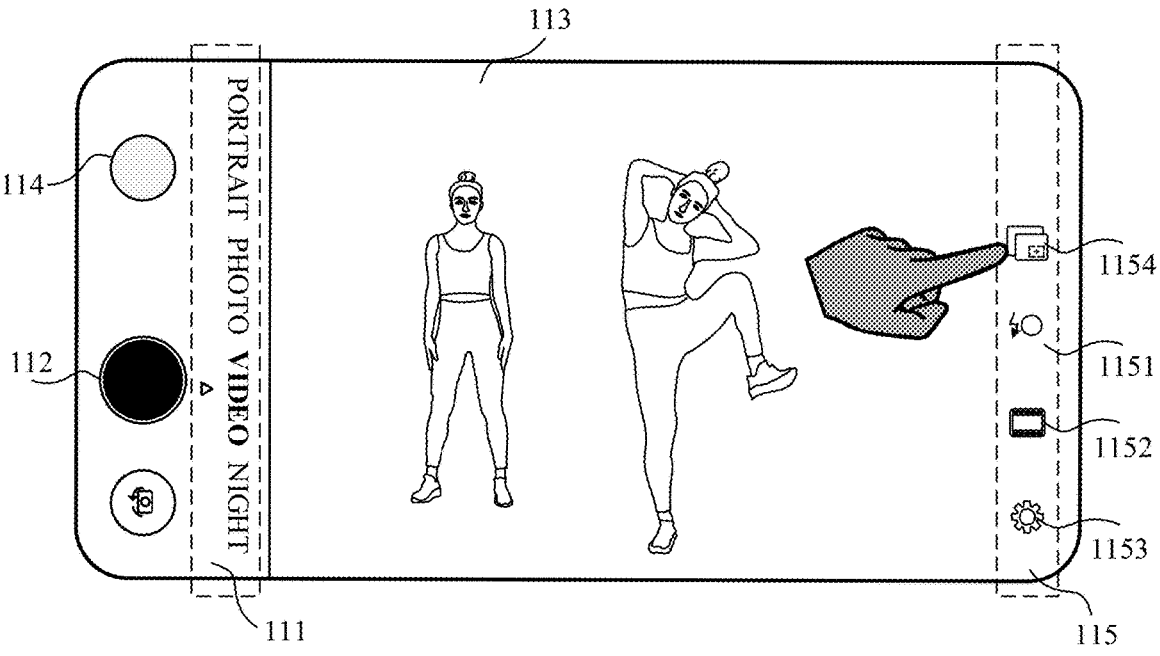
FIG. 1A-FIG. 1J are schematic diagrams of a group of user interfaces of a shooting method in a SOLO CUT mode according to an embodiment of this application.

Terms used in the following embodiments of this application are merely intended to describe specific embodiments, but not intended to limit this application.

To improve user experience, terminal devices such as a mobile phone and a tablet computer are usually configured with a plurality of cameras. A plurality of shooting modes are provided for photo and video functions, for example, a front-camera mode, a rear-camera mode, and a front-rear dual-camera mode. In a possible implementation, a user may record a video of one or more persons by using the terminal device. When the user wants to obtain a video of one of target persons, the user may perform manual clipping processing on the video. However, a manual clipping processing method is cumbersome, and a shooting user needs to have some video clipping skills. Consequently, user experience is poor.

In view of this, an embodiment of this application provides a shooting method, and a terminal device may provide a shooting function of a SOLO CUT mode. In the SOLO CUT mode, the terminal device may additionally generate a video for a protagonist, and no manual clipping processing is needed, improving shooting experience of the user.

Specifically, in the SOLO CUT mode, after determining a shot protagonist, a terminal 100 may simultaneously generate two videos, recorded as an original video and a close-up video. The original video includes a raw image collected by a camera. The close-up video is obtained by identifying a protagonist in the image based on the raw image, and then cropping a protagonist image. In a video recording process, the terminal 100 may simultaneously display the original video and the close-up video for previewing by the user.

This is not limited to generating one close-up video, and the user may alternatively select a plurality of protagonists. The terminal 100 may position the plurality of protagonists based on the raw image collected by the camera, to generate a plurality of close-up videos corresponding to the protagonists.

In this way, the user can not only shoot a protagonist-centered close-up video, but also simultaneously obtain the original video including the raw image collected by an original camera, to further meet a personalized requirement of the user, improving use experience of the user.

The method may be applied to the terminal devices such as a mobile phone and a tablet computer. In the following, the terminal 100 is used to refer to the foregoing terminal device. In addition to a mobile phone or a tablet computer, the terminal 100 may alternatively be a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, an onboard device, a smart household device, and/or a smart city device. A specific type of the terminal is not specially limited in this embodiment of this application.

The following specifically describes a schematic user diagram of implementing, by the terminal 100, the shooting method provided in the embodiment of this application.

First, FIG. 1A shows an example of a user interface in which a terminal 100 enables a camera to perform a shooting action.

As shown in FIG. 1A, the user interface may include a menu bar 111, a shooting control 112, a preview window 113, and a playback control 114.

A plurality of shooting mode options may be displayed in the menu bar 111, for example, "NIGHT", "VIDEO", "PHOTO", and "PORTRAIT" shooting modes. The NIGHT mode may be used to shoot a photo in a scenario with dim light, for example, shoot a photo at night. The VIDEO mode may be used to record a video. The PHOTO mode may be used to shoot a photo in a daylight scenario. The PORTRAIT mode may be used to shoot a close-up photo of a person.

When the camera is enabled to perform a shooting action, as shown in FIG. 1A, the terminal 100 may first enable the VIDEO mode to prepare to start recording a video. Certainly, the terminal 100 may first enable another shooting mode such as PHOTO or PORTRAIT. In this case, the terminal 100 may enter the VIDEO mode based on a user operation.

The shooting control 112 may be used to receive a shooting operation of a user. In a shooting scenario (which includes the PHOTO mode, the PORTRAIT mode, and the NIGHT mode), the shooting operation is an operation performed on the shooting control 112 for controlling shooting. In a video recording scenario (the VIDEO mode), the shooting operation includes an operation performed on the shooting control 112 for starting recording.

The preview window 113 may be used to display, in real time, an image stream collected by the camera. At any moment, one frame of image displayed in the preview window 113 is one frame of raw image.

The playback control 114 may be used to view a photo or a video shot previously. Usually, the playback control 114 may be used to display a thumbnail of the previously shot photo or a thumbnail of a first frame of image of the previously shot video.

In the VIDEO mode, the user interface shown in FIG. 1A may further include a function bar 115. The function bar 115 may include a plurality of function controls, for example, flash 1151, filter 1152, settings 1153, and a SOLO CUT mode 1154. The flash 1151 may be configured to enable or disable a flash, thereby changing picture brightness of an image collected by the camera. The filter 1152 may be used to select a filter style, thereby adjusting a color of an image in the preview window 113. The settings 1153 may be used to provide more controls for adjusting shooting parameters of the camera or image optimization parameters, for example, a white balance control, an ISO control, a facial beautification control, and a body beautification control, thereby providing richer shooting services for the user.

The SOLO CUT mode 1154 may be used to provide a function of shooting a protagonist-centered close-up video. Specifically, according to the shooting method in the SOLO CUT mode provided in this embodiment of this application, the terminal 100 may select and change a protagonist based on a user operation, and shoot and save at least two videos, respectively being a protagonist-centered close-up video, and an original video generated based on a raw image collected by the camera. There may be a plurality of protagonist-centered close-up videos. The terminal 100 may determine one or more protagonists based on a user operation. One protagonist may correspond to one or more close-up videos.

In a process of displaying the user interface shown in FIG. 1A, the terminal 100 may detect a user operation performed on the SOLO CUT mode 1154, to enable a SOLO CUT mode shooting function. The user operation performed on the SOLO CUT mode 1154 is, for example, an operation of tapping the SOLO CUT mode 1154. In response to the operation, the terminal 100 may execute an algorithm corresponding to the SOLO CUT mode, to enter a SOLO CUT mode shooting scenario, referring to FIG. 1B.

Figure 1B:
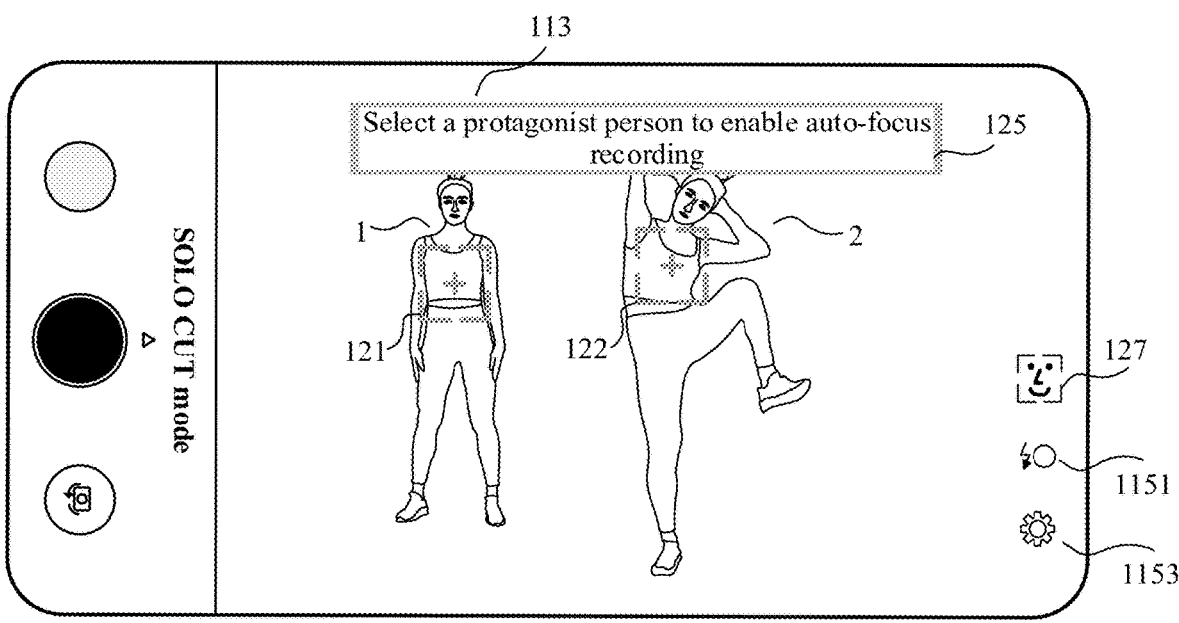

FIG. 1B shows an example of a user interface for shooting after a terminal 100 enters a SOLO CUT mode shooting scenario.

After entering the SOLO CUT mode, the terminal 100 may perform image identification on the image collected by the camera, to identify an object included in the image (namely, object identification). The object includes but is not limited to a person, an animal, and a plant. In this embodiment of this application, a person is mainly used as an example for description in the following.

Referring to an image displayed in the preview window 113 in FIG. 1B, at a moment, an image collected by the camera of the terminal 100 includes a person 1 and a person 2. After receiving the image, the terminal 100 may first identify, by using a preset object identification algorithm, an object included in the image. Herein, the object identification algorithm may be a human body detection algorithm. It may be understood that the terminal 100 further supports identifying types of objects such as an animal and a plant. Correspondingly, the object identification algorithm further includes an identification algorithm for one or more types of animals and an identification algorithm for one or more types of plants. This is not limited in this embodiment of this application. In this case, after performing processing by using the object identification algorithm, the terminal 100 may identify that the image includes two objects: the person 1 and the person 2.

After receiving the image, the terminal 100 may display the image in the preview window 113. Based on the identified objects included in the image, the terminal 100 may further display a selection box corresponding to each object while displaying the image. For example, the terminal 100 may display a selection box 121 corresponding to the person 1 on the person 1, and display a selection box 122 corresponding to the person 2 on the person 2. In this case, on the one hand, the user may confirm, by using the selection box, that the terminal 100 detects the object that can be selected by the user. On the other hand, the user may set, by tapping any one of the selection boxes, an object corresponding to the selection box as a protagonist.

Optionally, the terminal 100 may further display a prompt 125 in the preview window 113, for example, "select a protagonist person to enable auto-focus recording", which is used to prompt the user to select a protagonist.

In the user interface shown in FIG. 1B, the preview window 113 may include a facial beautification control 127. The facial beautification control 127 may be used to adjust a face image of a person in an image. After detecting a user operation performed on the facial beautification control 127, the terminal 100 may perform facial beautification processing on the person in the image, and display, in the preview window, an image obtained after facial beautification processing. The user interface shown in FIG. 1B may further display another shooting control, for example, a focal length control used to adjust the camera. Details are not described herein.

When displaying the user interface shown in FIG. 1B, the terminal 100 may detect a user operation performed on any selection box. In response to the operation, the terminal 100 may determine an object corresponding to the selection box as a protagonist. For example, referring to a user interface shown in FIG. 1C, the terminal 100 may detect a user operation performed on the selection box 122. In response to the operation, the terminal 100 may determine the person 2 corresponding to the selection box 122 as a protagonist.

Then, the terminal 100 may display a small window in a picture-in-picture mode (embedded) in the preview window 113, and display a close-up image of the person 2 in the small window. The close-up image is an image obtained by performing cropping by using the selected protagonist as a center based on the raw image collected by the camera (the image displayed in the preview window). Optionally, the terminal 100 may also divide an original display area corresponding to the preview window 113 into two parallel parts: One part is used to display the image collected by the camera; and the other part is used to display the close-up image obtained based on the image collected by the camera.

Figure 1C:
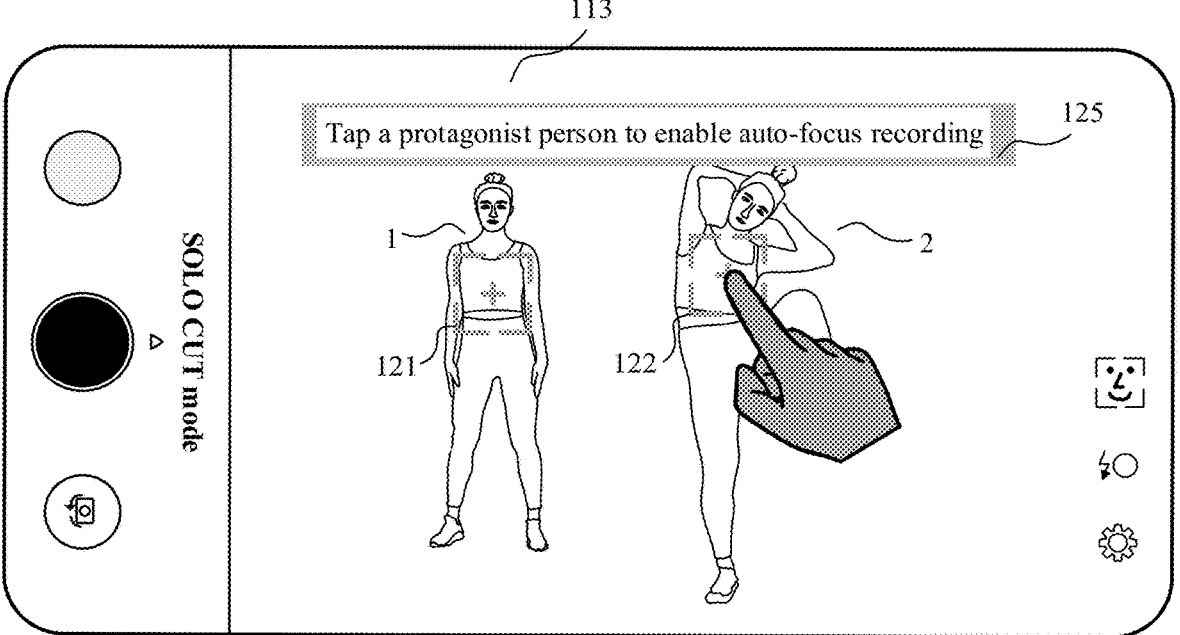
Figure 1D:
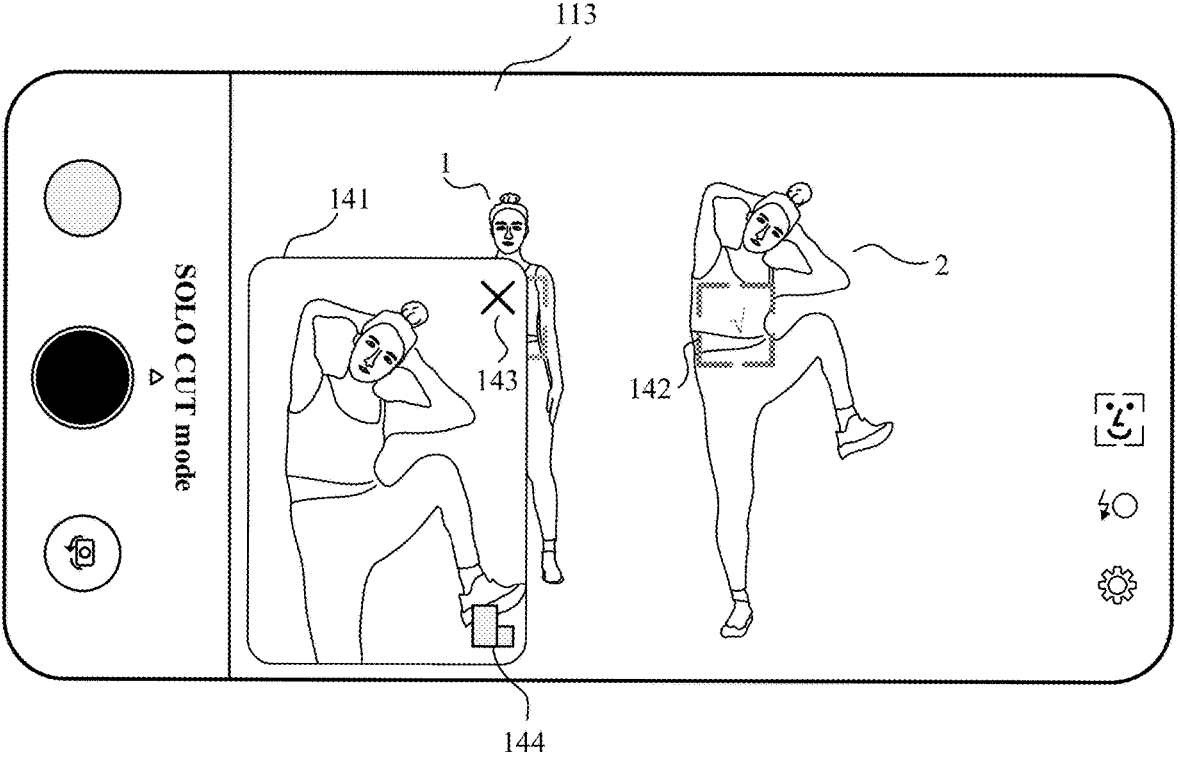

FIG. 1D shows an example of a user interface of a terminal 100 for displaying a small window and displaying a close-up image of a person 2 in the small window.

As shown in FIG. 1D, the preview window 113 may include a small window 141. In this case, the close-up image of the person 2 may be displayed in the small window 141. As the person 2 in the raw image displayed in the preview window 113 changes, the close-up image of the person 2 displayed in the small window 141 also correspondingly changes. In this way, consecutive close-up images that are displayed in the small window 141 and that are centered on the person 2 are included in a close-up video of the person 2.

Optionally, the close-up image displayed in the small window 141 and the raw image displayed in the preview window 113 may alternatively come from different cameras. For example, the close-up image displayed in the small window 141 may be an image collected by a long-focus camera, and the raw image displayed in the preview window 113 may be an image collected by a wide-angle camera. A common camera and the wide-angle camera may collect images simultaneously. Images collected by the long-focus camera and the wide-angle camera may be corresponding to each other by using timestamps. In this case, the close-up image displayed in the small window 141 is obtained by cropping the image collected by the common camera. The image collected by the common camera corresponds to an image collected by the wide-angle camera displayed in the preview window 113 at a same moment. In this way, the user can browse a larger range of landscape in the preview window 113, and simultaneously, a protagonist image with more details is displayed in the small window 141. The foregoing wide-angle and long-focus are merely examples. A displayed image in the small window 141 may alternatively come from any camera such as a wide-angle camera, an ultra-wide-angle camera, a black and white camera, or a multi-spectral camera. Similarly, the image displayed in the preview window 113 may alternatively come from any camera such as the ultra-wide-angle camera, the long-focus camera, the black and white camera, or the multi-spectral camera.

After it is determined that the person 2 is a shot protagonist, the selection box 122 corresponding to the person 2 may become a check box 142 in FIG. 1D. The user may distinguish between a protagonist object and a non-protagonist object by using the check box 142. Not limited to the check box 142 shown in the user interface, the terminal 100 may further display an icon of another style, or use a different color. This is not limited in this embodiment of this application.

In some examples, the user may alternatively select a plurality of protagonists. For example, in the user interface shown in FIG. 1D, the terminal 100 may further detect a user operation performed on the selection box 121. In response to the operation, the terminal 100 may determine the person 1 corresponding to the selection box 121 as another protagonist. In some examples, the terminal 100 may display a small window correspondingly displaying a close-up image of the person 1. In some other examples, to avoid largely blocking the preview window 113, when there are a plurality of protagonists, the terminal 100 may also display only one small window that displays a close-up image of the protagonist. The terminal 100 may generate a plurality of close-up videos corresponding to the plurality of selected protagonists.

Optionally, the small window 141 used to display the close-up image may further include a close control 143 and a transpose control 144. The close control 143 may be used to close the small window 141. The transpose control may be used to adjust a size of the small window 141.

Figure 1E:
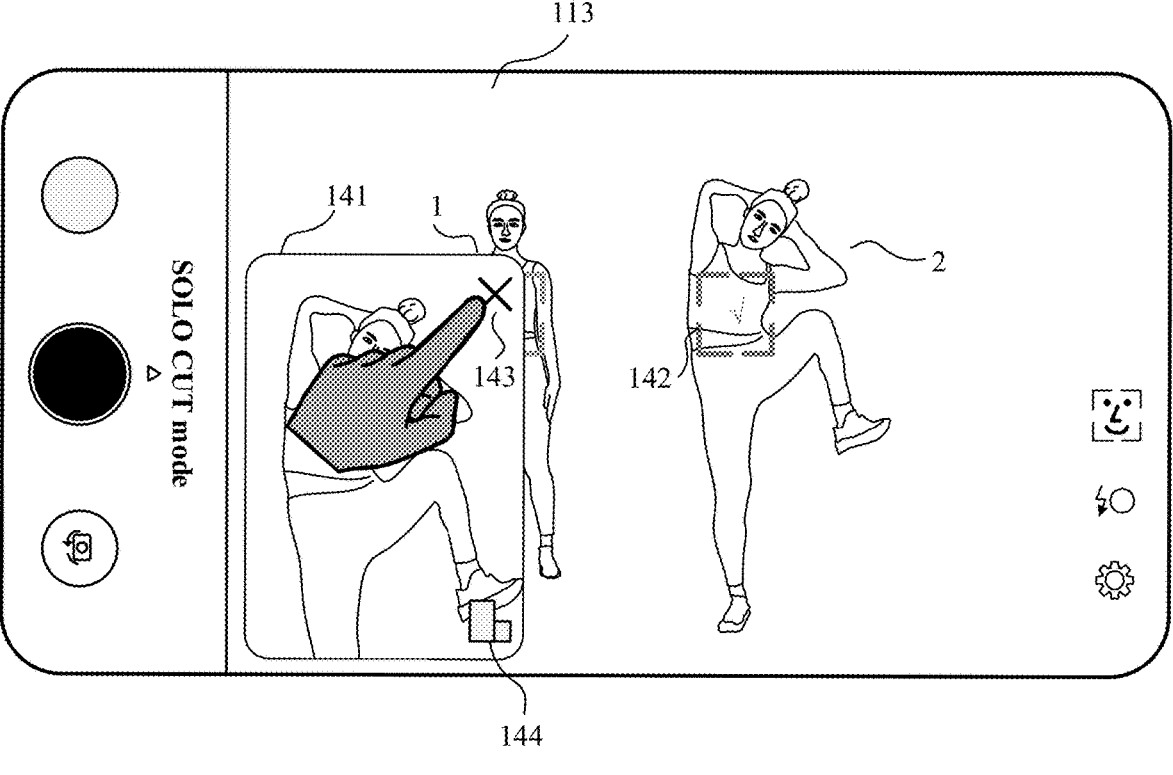
Figure 1F:
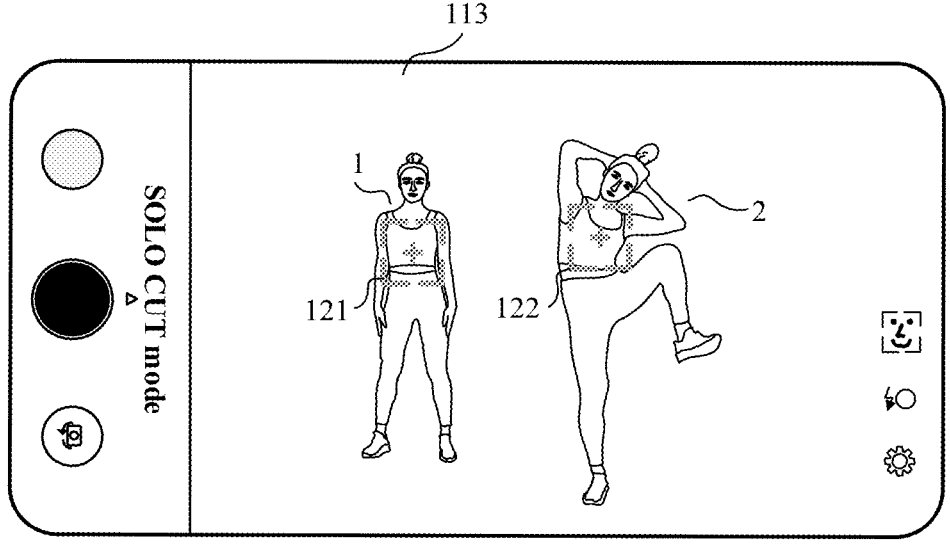

Referring to FIG. 1E, the terminal 100 may detect a user operation performed on the close control 143. In response to the operation, the terminal 100 may close the small window 141, referring to FIG. 1F. As shown in FIG. 1F, when closing the small window 141, the terminal 100 may cancel a previously selected protagonist (the person 2). Correspondingly, the check box 142 corresponding to the person 2 may be changed to the selection box 122. In this case, the user may re-select any object identified in the preview window 113 as a protagonist. The terminal 100 may re-display the small window 141 in the preview window 113 based on a re-determined protagonist. In this case, the small window 141 displays a close-up image that is centered on a new protagonist and that is obtained by processing the raw image.

Figure 1G:
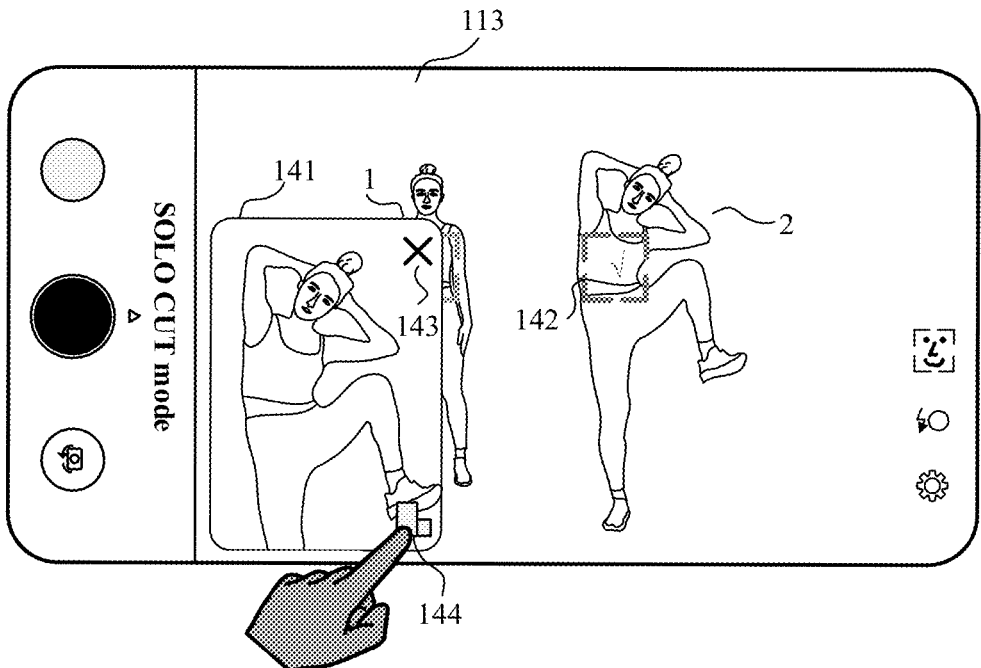
Figure 1H:
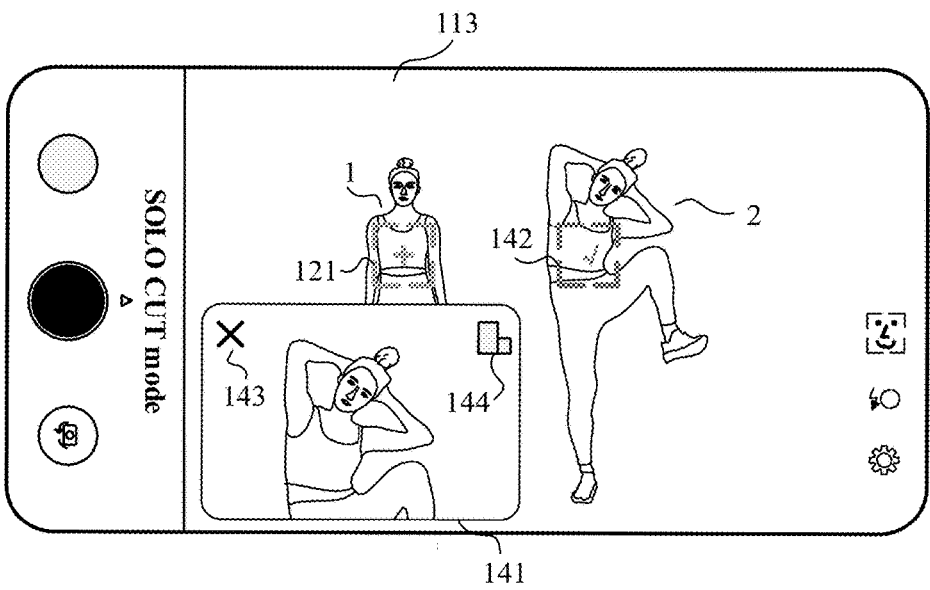

Referring to FIG. 1G, the terminal 100 may detect a user operation performed on the transpose control 144. In response to the operation, the terminal 100 may adjust the small window 141 in FIG. 1F from vertical to horizontal, referring to FIG. 1H.

Optionally, after determining the protagonist, the terminal 100 may first generate a small window (a vertical window) that is used to display the close-up image and whose aspect ratio is 9:16, referring to the small window 141 in FIG. 1D. The foregoing aspect ratio is an example and the aspect ratio of the vertical window includes but is not limited to 9:16. Optionally, the terminal 100 may fixedly display the small window 141 in lower left (or lower right, upper left, or upper right) of a screen. After detecting the user operation performed on the transpose control 144, the terminal 100 may change the original vertical window to a horizontal small window (horizontal window) with an aspect ratio of 16:9. Certainly, the terminal 100 may alternatively generate a horizontal window by default, and then adjust the horizontal window to a vertical window based on a user operation. This is not limited in this embodiment of this application. In this way, the user can adjust video content and a video format of the close-up video by using the transpose control 144 to meet a personalized requirement of the user.

In some examples, a display location of the small window may be further adjusted based on a location of the protagonist in the preview window, to avoid blocking the protagonist in the preview window 113. Further, the terminal 100 may further adjust a location and a size of the small window based on a user operation. In some examples, the terminal 100 may further detect a long press operation and a drag operation that are performed on the small window 141. In response to the operations, the terminal 100 may move the small window to a location at which the drag operation of the user finally stops.

In some other examples, the terminal 100 may further detect a double-tap operation performed on the small window 141. In response to the operation, the terminal 100 may zoom in or out the small window 141. Not limited to the long press operation, the drag operation, and the double-tap operation described above, the terminal 100 may further control and adjust the location and the size of the small window by using gesture recognition and voice recognition. For example, the terminal 100 may identify, by using an image collected by the camera, that the user makes a fist clenching gesture. In response to the fist clenching gesture, the terminal 100 may zoom out the small window 141. The terminal 100 may identify, by using an image collected by the camera, that the user makes a hand-opening gesture. In response to the hand-opening gesture, the terminal 100 may zoom in the small window 141.

Optionally, after entering the SOLO CUT mode, and identifying only a first object within a preset time, the terminal 100 may alternatively set the object as a protagonist by default. For example, referring to the user interface shown in FIG. 1B, within 5 seconds, an identified object displayed in the preview window 113 that can be used as a protagonist is only the person 2. In this case, the terminal 100 may set the person 2 as the protagonist by default. In this way, in a typical single-person shooting scenario, the terminal 100 may intelligently determine a protagonist, thereby reducing a user operation.

Optionally, after entering the SOLO CUT mode, when identifying a plurality of objects, the terminal 100 may alternatively select one optimal object from the plurality of objects as a protagonist according to a preset evaluation rule. The evaluation rule is, for example, a size of a person image and image brightness of a face area. Details are not described herein.

Before video recording is started, after the protagonist is determined, if the selected protagonist is lost (the image displayed in the preview window 113 does not include the protagonist), the close-up image of the protagonist displayed in the small window 141 is frozen to the last frame before the loss.

Figure 1I:
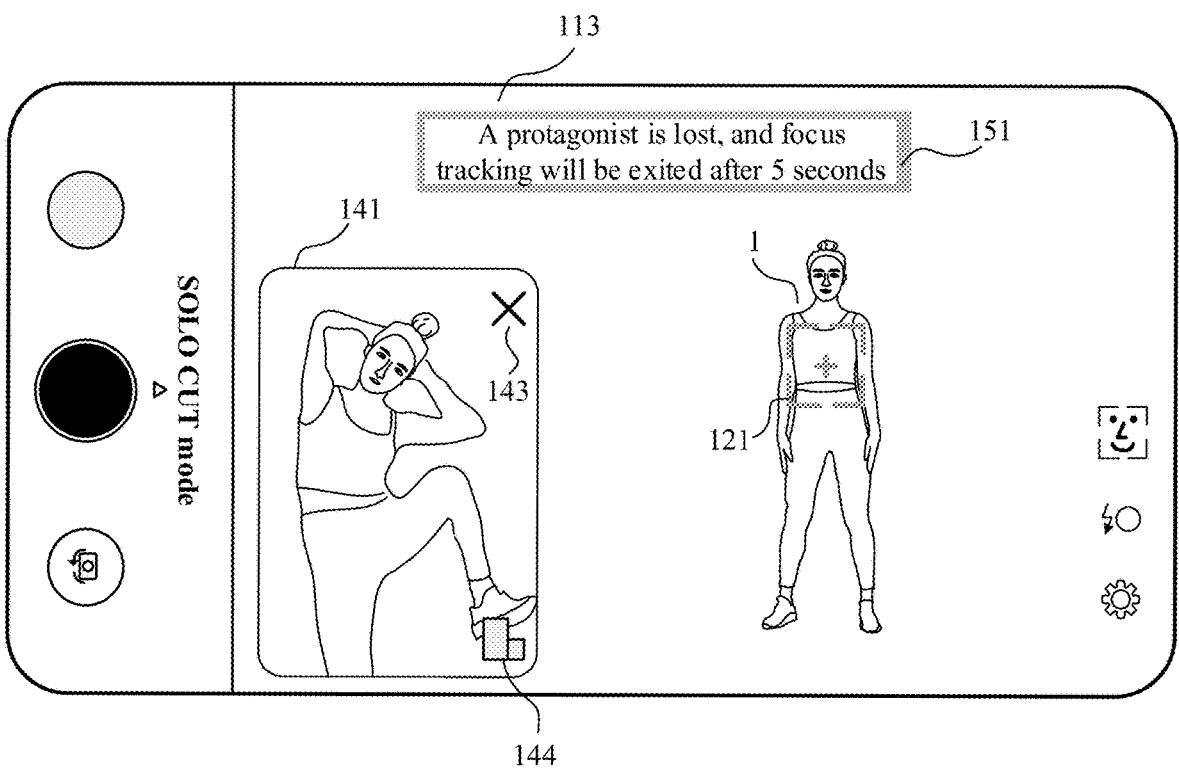

Referring to FIG. 1D, an image displayed in the preview window 113 may be an nth frame of image collected by the camera. In this case, the image displayed in the small window 141 is a close-up image that is obtained based on the nth frame of image and that is centered on the protagonist (the person 2). Referring to FIG. 1I, the display image in the preview window 113 may be an (n+1)th frame of image collected by the camera. In this case, the (n+1)th frame of image does not include the previously selected protagonist (the person 2), that is, the protagonist is lost. In this case, the close-up image that is obtained based on the nth frame of image and that is centered on the protagonist (the person 2) remains displayed in the small window 141.

As shown in FIG. 1I, after detecting that the protagonist is lost, the terminal 100 may further display a prompt 151 in the preview window 113, for example, "the protagonist is lost, and focus tracking will be exited after 5 seconds", to prompt the user to adjust a location or an angle of the camera, so that the terminal 100 can re-obtain a raw image including the protagonist.

Figure 1J:
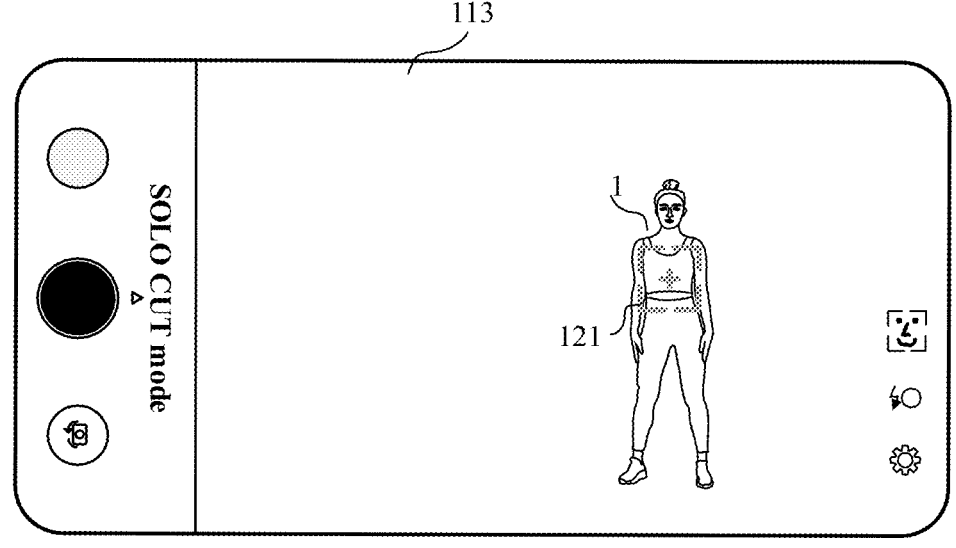

As shown in FIG. 1J, if the terminal 100 still does not find the protagonist (the person 2) after 5 seconds, that is, the image collected by the camera still does not include the previously selected protagonist (the person 2), the terminal 100 may close the small window 141, and cancel the previously selected protagonist (the person 2). The foregoing 5 seconds is preset, and the terminal 100 may alternatively set another time length, for example, 10 seconds. This is not limited in this embodiment of this application.

In a preview process, after determining the protagonist, the terminal 100 may start recording a video. In the SOLO CUT mode provided in this embodiment of this application, the terminal 100 may generate the original video based on the raw image displayed in the preview window 113. In addition, the terminal 100 may further generate the close-up video based on the close-up image of the protagonist in the small window 141.

Figure 2A:
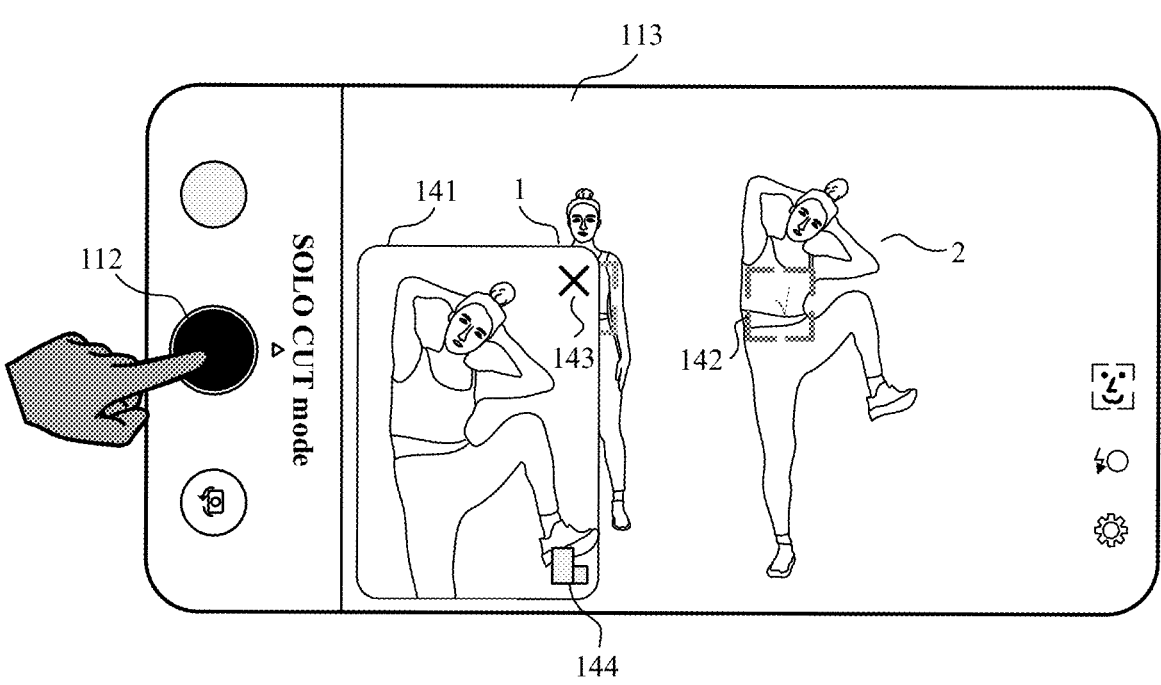
FIG. 2A-FIG. 2I are schematic diagrams of a group of user interfaces of a shooting method in a SOLO CUT mode according to an embodiment of this application.

As shown in FIG. 2A, the terminal 100 may detect a user operation performed on the shooting control 112. The operation may be referred to as a user operation of starting shooting (starting recording). The shooting control 112 is also referred to as a recording control. In response to the operation, the terminal 100 may start recording videos (the original video and the close-up video), that is, encode and save the raw image collected by the camera and the protagonist-centered close-up image. In this case, a start recording moment of the original video is the same as a start recording moment of the close-up video. In some examples, the user operation of starting shooting may be further a preset user body movement or voice instruction. The user body movement includes a gesture movement (for example, raising a hand or making a fist) and a postural movement (for example, jumping or running).

Figure 2B:
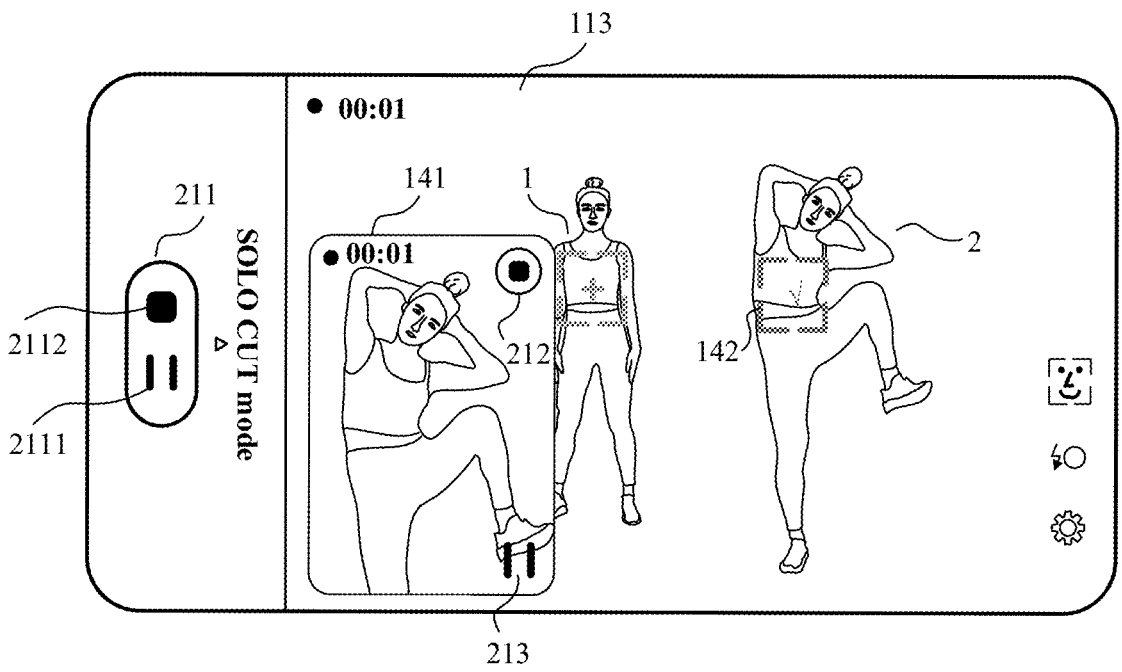

After video recording is started, a user interface shown in FIG. 2A changes to that shown in FIG. 2B. As shown in FIG. 2B, after starting recording a video, the terminal 100 may display a control module 211. The control module 211 may include a pause control 2111 and a stop control 2112. The pause control 2111 may be used to pause video recording, including pause recording of the original video corresponding to the preview window 113, and pause recording of the close-up video corresponding to the small window 141. The stop control 2112 may be used to stop recording a video, including stop recording the original video and stop recording the close-up video.

After video recording is started, timestamps may be displayed in both the preview window 113 and the small window 141. For example, a timestamp "00:01" is displayed at an upper left corner of the preview window 113, and a timestamp "00:01" is displayed at an upper left corner of the small window 141. Initially, the timestamps in the preview window 113 and the small window 141 are the same. Subsequently, the timestamps in the preview window 113 and the small window 141 may be different based on an on-camera situation of the protagonist in the preview window 113. Details are not described herein.

Optionally, after starting recording a video, the terminal 100 may alternatively determine the protagonist, generate the small window 141, and display the close-up video of the protagonist. In this case, the terminal 100 first detects the user operation of starting recording, and then detects an operation of tapping a selection box to select a corresponding object as a protagonist. A video corresponding to detecting the user operation of starting recording is the start recording moment of the original video. A moment corresponding to the operation of tapping the selection box to select the corresponding object as the protagonist is a start recording video of the close-up video. Therefore, in the foregoing recording scenario, the start recording moment of the close-up video is after that of the original video.

Optionally, after video recording is started, the small window 141 may further display a stop control 212. The stop control 212 may be used to stop recording the close-up video. After detecting a user operation performed on the stop control 212, the terminal 100 may close the small window 141, and stop recording the close-up video corresponding to the small window 141. After stopping recording the video in the small window, the terminal 100 may generate a close-up video based on a recorded image in the small window. In this case, the terminal 100 does not stop recording the original video.

Thereafter, optionally, the user may reselect a protagonist. After selecting a new protagonist, the terminal 100 may re-display the small window 141, display a close-up video of the new protagonist in the small window 141, and record a close-up video of the new protagonist. The new protagonist may be the same as or different from the previously selected protagonist. In this case, the terminal 100 saves a recorded image in the small window as another close-up video.

Optionally, a pause control 213 may be further displayed in the small window 141. After detecting a user operation performed on the pause control 213, the terminal 100 may pause updating of the image displayed in the small window 141, and also pause recording of the image in the small window 141 (that is, pause recording of the close-up video). After detecting the user operation performed on the pause control 213, the terminal 100 may display a continue recording control (not shown in FIG. 2B) instead of the pause control 213. After detecting a user operation performed on the continue recording control, the terminal 100 may resume updating the image displayed in the small window 141, simultaneously resume recording the close-up video, and display the pause control 213 in the small window 141 instead of the continue recording control.

The terminal 100 may further monitor a user operation performed on the screen. On a basis of displaying the user interface shown in FIG. 2B, when the user operation, for example, a tap operation, performed on the preview window 113 on the screen is not monitored and detected within 5 seconds, the terminal 100 may hide the selection box in the preview window 113. When the user operation performed on the small window 141 on the screen is not monitored within 5 seconds, the terminal 100 may hide a function control in the small window 141, for example, the timestamp and the stop control 212 of the small window.

After starting recording a video, the terminal 100 may further provide a protagonist switching service. Referring to the user interface shown in FIG. 2C, at the 5th second after video recording is started, the terminal 100 may detect a user operation performed on the selection box 121. The operation may be referred to as a user operation of protagonist switching. In response to the operation, the terminal 100 may set the person 1 corresponding to the selection box 121 as a protagonist. In this case, the person 2 previously set as the protagonist is no longer the protagonist.

Figure 2C:
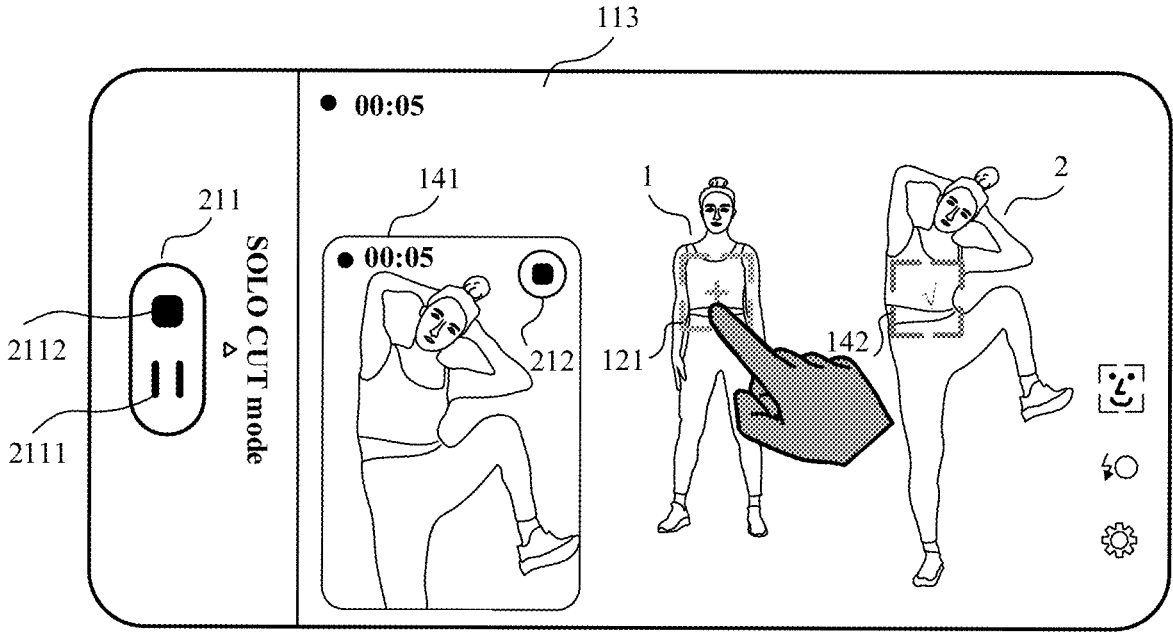
Figure 2D:
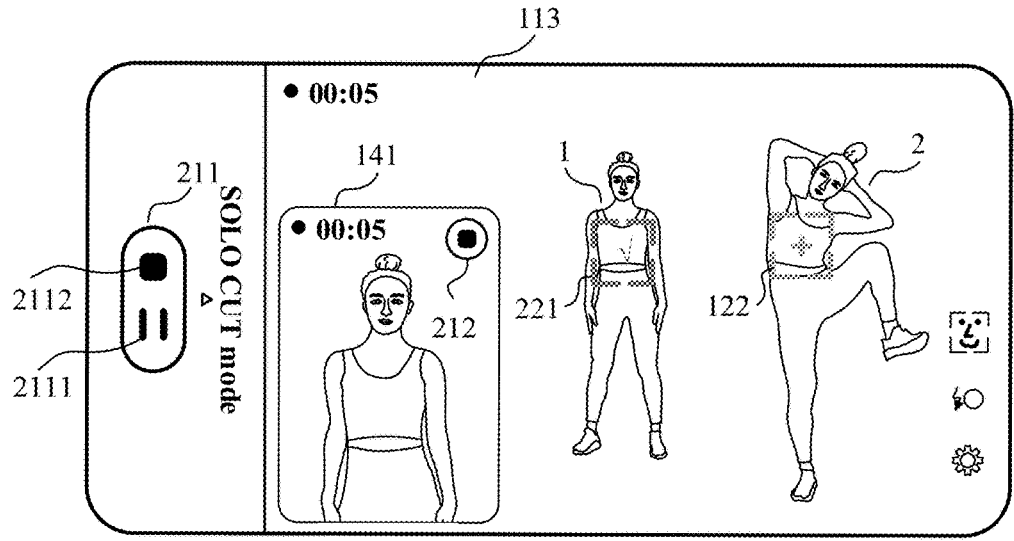

Referring to a user interface shown in FIG. 2D, after setting the person 1 as the protagonist, the terminal 100 may display a close-up image of the person 1 in the small window 141, and no longer display the close-up image of the person 2. Adaptively, the terminal 100 may update the selection box 121 corresponding to the person 1 to a check box 221, and simultaneously update the check box 142 corresponding to the person 2 to the selection box 122.

In a protagonist switching process, the small window 141 may directly display the close-up image of the switched person 1, and present a jumping display effect. Optionally, the small window 141 may alternatively implement a non-jumping display effect of protagonist switching by using a smoothing policy. For example, after the protagonist is switched to the person 1, the terminal 100 may determine a group of smoothly moving image frames according to a path from the person 2 to the person 1 in the preview window 113, and then display the image frames in the small window 141, to implement non-jumping protagonist switching display. For example, the terminal 100 may further use a fixed transition effect to connect close-up images of protagonists before and after switching. The fixed transition effect is, for example, superposition, swirl, or translation commonly used in video editing. This is not limited in this embodiment of this application.

Optionally, an automatic protagonist selection algorithm may be further preset in the SOLO CUT mode. An object evaluation rule is preset in the algorithm. The automatic protagonist selection algorithm may automatically determine an object with best performance as a protagonist from the plurality of identified objects according to the object evaluation rule. In a scenario in which the protagonist is determined according to the automatic protagonist selection algorithm, the terminal 100 may also switch the protagonist based on a score change of each object. For example, at the beginning of a video recording process, an evaluation of the person 2 is highest. In this case, the terminal 100 may determine the person 2 as the protagonist. Subsequently, the terminal 100 may detect that an evaluation of the person 1 is higher than that of the person 2. In this case, the terminal 100 may change the protagonist from the person 2 to the person 1.

In the video recording process, the protagonist initially selected by the user may leave a viewfinder range of the camera of the terminal 100. In this case, a situation in which the protagonist is lost occurs in the raw image corresponding to the preview window 113. Similarly, after identifying that the protagonist is lost, the terminal 100 may display a prompt that the protagonist is lost, and freeze the close-up image of the protagonist in the small window 141.

Figure 2E:
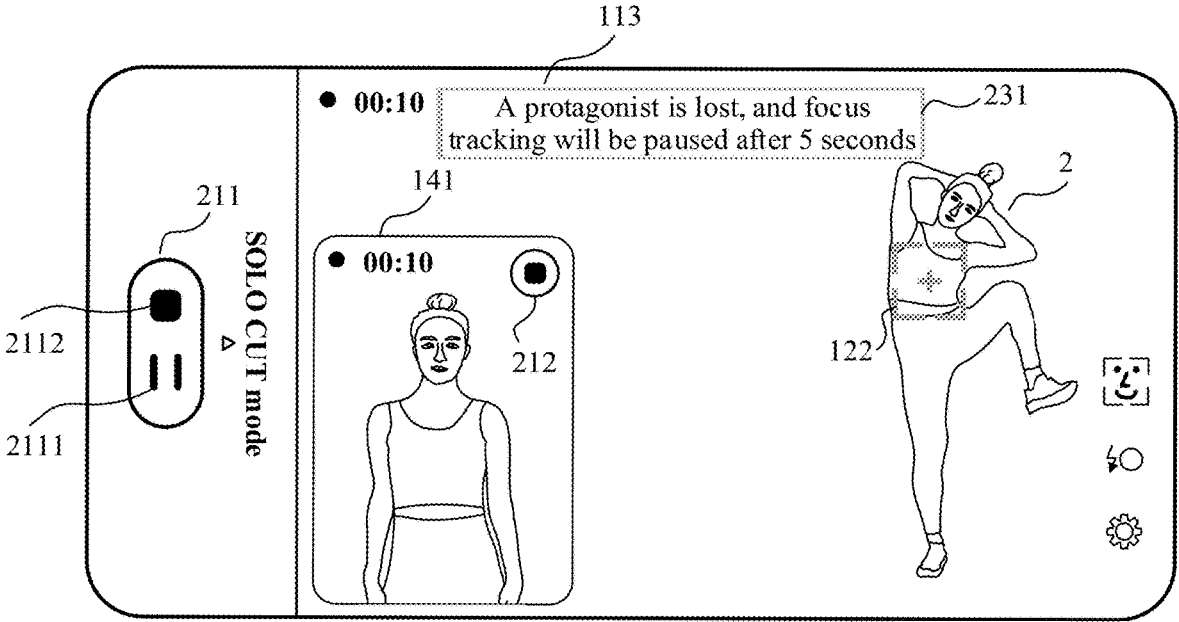

Referring to a user interface shown in FIG. 2E, at the 10th second after video recording is started, the terminal 100 may detect that a raw image (a raw image collected by the camera) displayed in the preview window 113 includes the person 2 but does not include the person 1 (the protagonist), that is, the protagonist is lost. In this case, the terminal 100 may display a prompt 231 ("the protagonist is lost, and focus tracking will be exited after 5 seconds") in the preview window 113, to prompt the user to adjust a location or an angle of the camera, so that the terminal 100 can re-obtain a raw image including the protagonist. In addition, the terminal 100 may keep displaying, in the small window 141, a close-up image of a protagonist (the person 1) determined at a previous moment. From a user perspective, the close-up image displayed in the small window 141 is paused, and is frozen to the close-up image of the protagonist (the person 1) determined at the previous moment. Correspondingly, the timestamp displayed at the upper left corner of the small window 141 is paused.

After seeing the prompt 231, the user may adjust the location of the camera to enable the protagonist to be within the viewfinder range of the camera, so that the camera can re-collect an image including the protagonist.

Figure 2F:
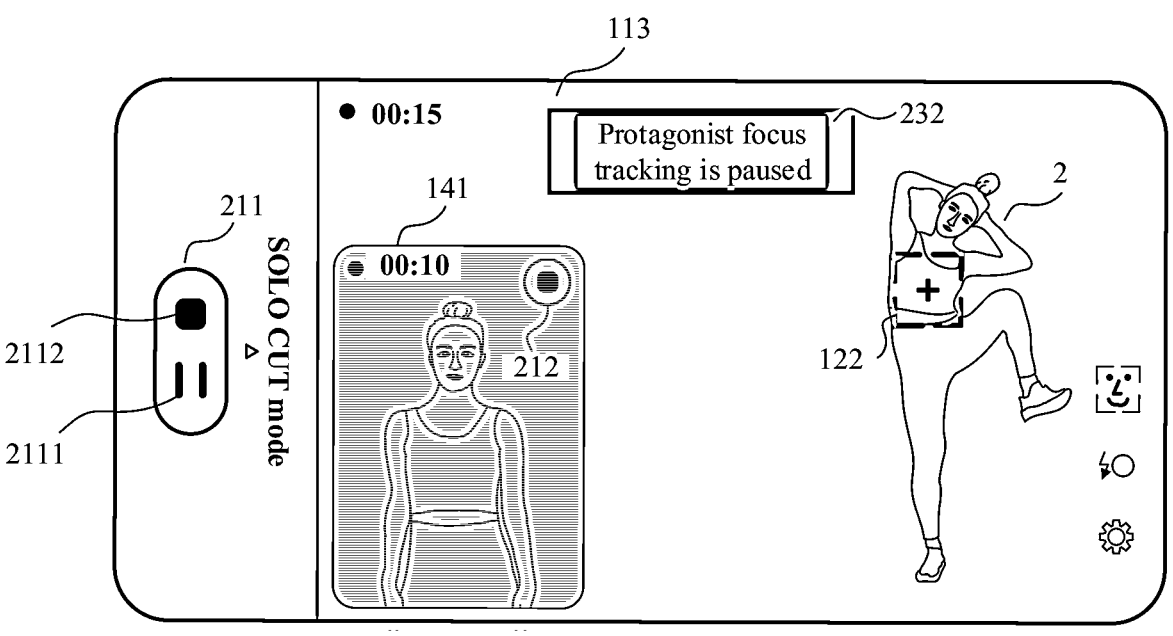

As shown in FIG. 2F, if the terminal 100 still does not find the protagonist (the person 1) after 5 seconds (at the 15th second 00:15 after video recording is started), that is, an image in the preview window 113 still does not include the previously selected protagonist (the person 1), the terminal 100 may display a prompt 232 ("protagonist focus tracking is paused"). In addition, the terminal 100 may display a semi-transparent gray mask on an image layer on which the close-up image is displayed in the small window 141, to prompt the user that focus tracking recording is paused.

It may be understood that, at the 10th second shown in FIG. 2E, the terminal 100 pauses recording of the close-up video in the small window 141. A time period of 5 seconds from the 10th second to the 15th second is a transition time that is set for the terminal 100 and that is used for user adjustment. Optionally, in the time period of 5 seconds from the 10th second to the 15th second, the terminal 100 may also crop a subsequent image in the preview window 113 in a manner of cropping the last frame of close-up image before the protagonist is lost, to obtain a close-up image. In this case, the image may not include the protagonist.

If the terminal 100 re-identifies the protagonist (the person 1) at a moment after pausing recording of the close-up video, in this case, the terminal 100 may display a close-up image of the newly obtained protagonist (the person 1) in the small window 141, and continue to record a close-up video.

Figure 2G:
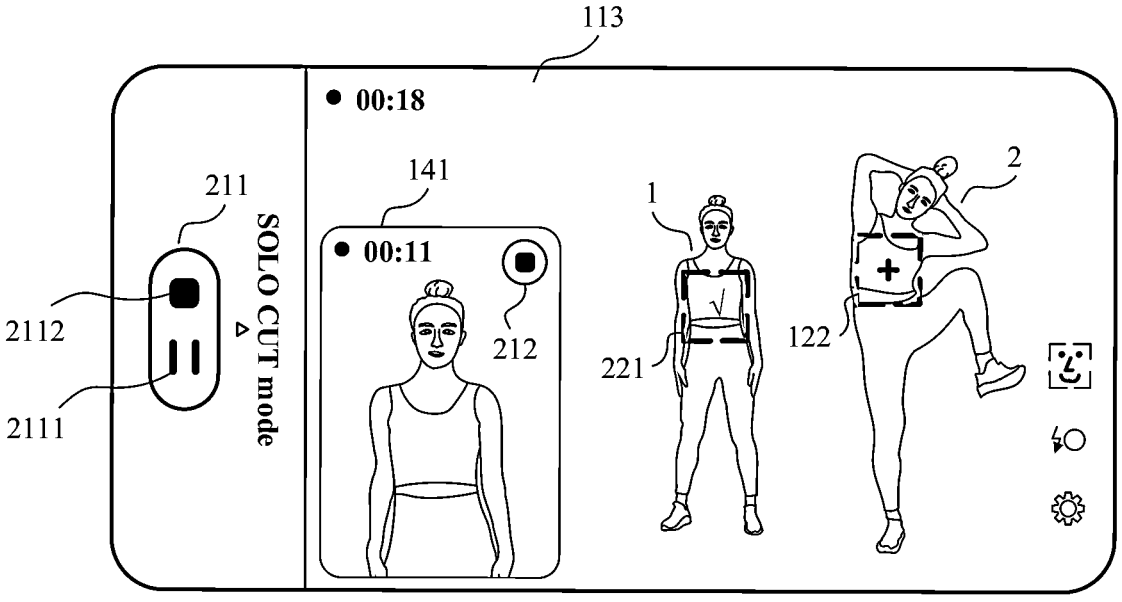

For example, referring to a user interface shown in FIG. 2G, at the 18th second after video recording is started, the camera re-collects an image including the person 1, that is, an image displayed in the preview window 113 includes the person 1 again. In this case, the terminal 100 may determine, based on the raw image including the person 1, a close-up image centered on the person 1, and then display the close-up image in the small window 141. Correspondingly, the timestamp displayed at the upper left corner of the small window 141 resumes timing. In addition, the terminal 100 continues to encode the close-up image, that is, continues to record the close-up video.

After recording the video for a period of time, the terminal 100 may detect a user operation of ending shooting. Referring to a user interface shown in FIG. 2H, for example, at the 25th second after video recording is started, the terminal 100 may detect a user operation performed on the stop control 2112. The user operation may be referred to as a user operation of ending shooting. In response to the user operation of ending shooting, the terminal 100 may stop encoding an image, and encapsulate encoded images from starting recording to ending recording as a video into a local memory.

In response to the user operation of ending shooting, the terminal 100 may stop encoding a raw image corresponding to the preview window 113, and encapsulate encoded raw images from starting recording to ending recording as an original video into the local memory. Simultaneously, the terminal 100 may stop encoding a close-up image corresponding to the small window 141, and encapsulate encoded close-up images from starting recording to ending recording as a close-up video into the local memory.

Figure 2H:
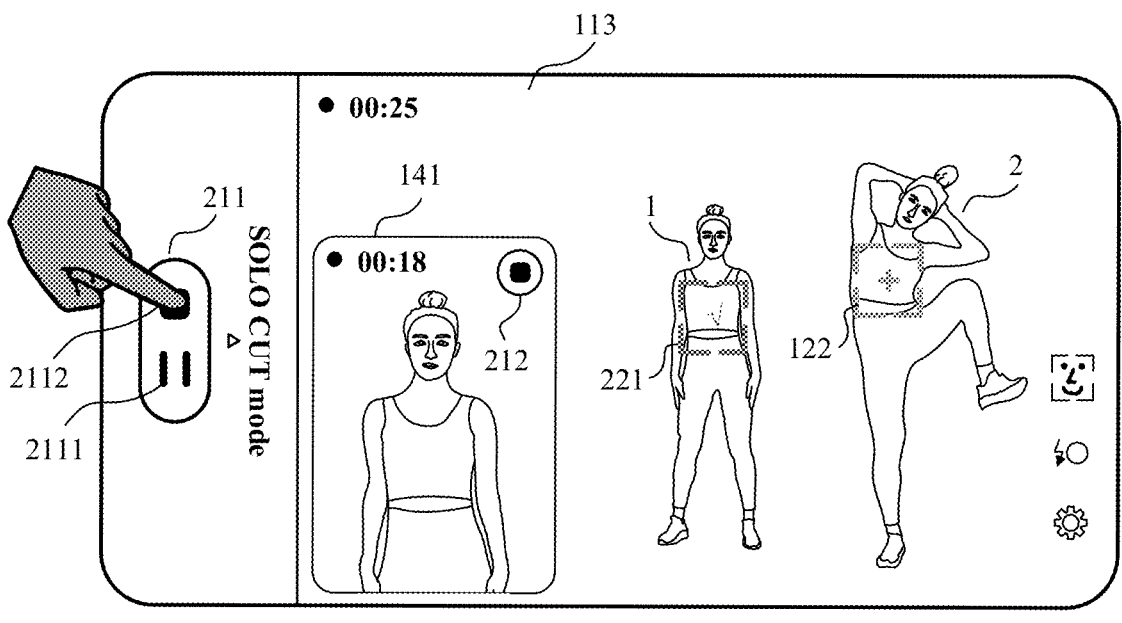
Figure 2I:
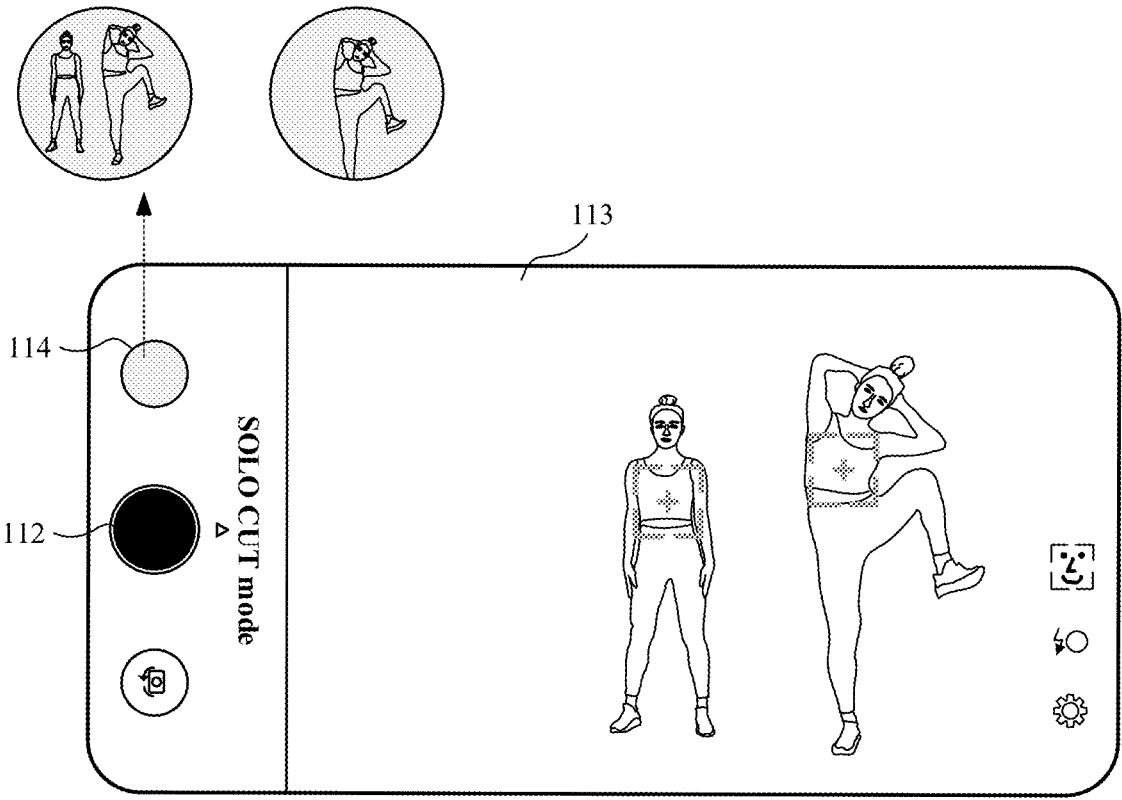

After saving is completed, the terminal 100 may display a user interface shown in FIG. 2I. As shown in FIG. 2H, the terminal 100 may re-display the shooting control 112 and the playback control 114. In this case, thumbnails used to indicate the recorded original video and the recorded close-up video may be displayed on the playback control 114. Optionally, the foregoing identifier may be a thumbnail of the first frame of image of the original video or a thumbnail of the first frame of image of the close-up video.

In a process of displaying the user interface shown in FIG. 2I, the terminal 100 may detect a user operation performed on the playback control 114. In response to the operation, the terminal 100 may play the shot original video and/or the shot close-up video. In this way, the user immediately views the original video and/or the close-up video.

Figure 3A:
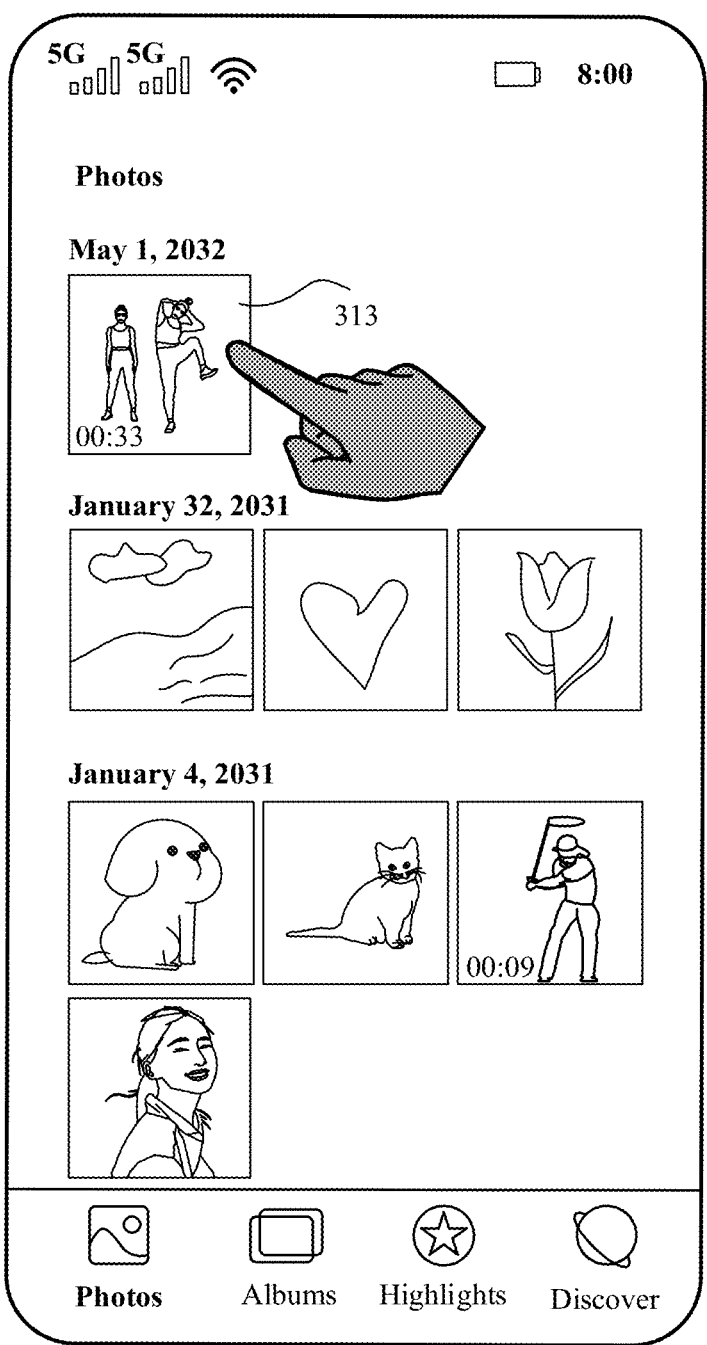
FIG. 3A-FIG. 3C are schematic diagrams of a group of user interfaces for browsing shot images according to an embodiment of this application.

FIG. 3A shows an example of a user interface provided by a gallery application on a terminal 100 for displaying a locally saved video and/or picture. The gallery application (or referred to as an album application) is an application on the terminal 100 that is used to manage the locally saved video and/or picture.

As shown in FIG. 3A, the user interface may display a plurality of thumbnail icons. One thumbnail icon corresponds to a video or a picture obtained after one shooting operation. For example, the plurality of thumbnail icons may include an icon 313. The icon 313 may correspond to the videos generated by using the shooting operations shown in FIG. 2A-FIG. 2I.

The terminal 100 may detect a user operation performed on the icon 313. In response to the operation, the terminal 100 may display the videos shot by using the shooting operations shown in FIG. 2A-FIG. 2I: the original video and the close-up video, referring to FIG. 3B.

Figure 3B:
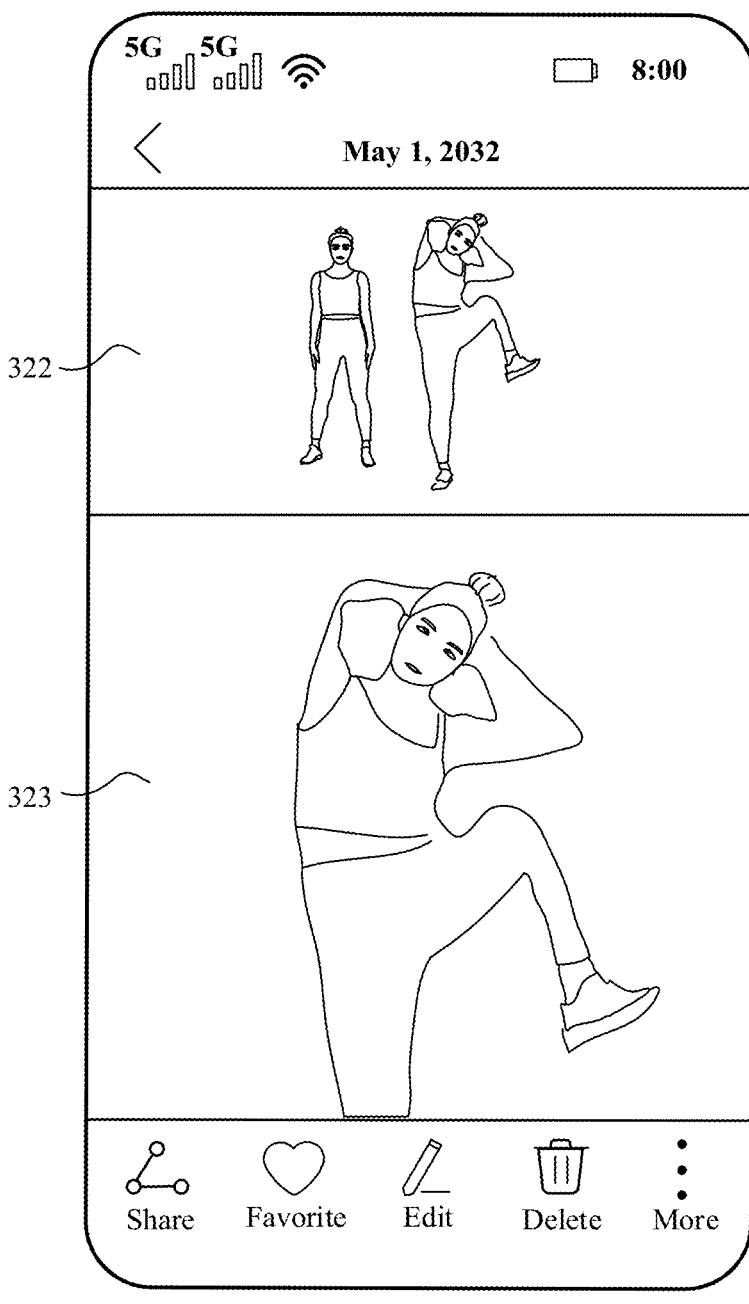

As shown in FIG. 3B, this user interface may include a window 322 and a window 323. The window 322 may be used to display the original video shot by using the shooting operations shown in FIG. 2A-FIG. 2I. The window 323 may be used to display the close-up video shot by using the shooting operations shown in FIG. 2A-FIG. 2I.

In some examples, when displaying the user interface shown in FIG. 3B, the terminal 100 may simultaneously play both the original video and the close-up video. A video frame of the close-up video is aligned with that of the original video. In this way, the user can simultaneously browse both the original video and the close-up video. In some examples, the terminal 100 may first play the original video, and then play the close-up video, so that the user browses each video separately.

Further, on a basis of the user interface shown in FIG. 3B, the terminal 100 may detect a user operation, for example, a tap operation, performed on the original video or the close-up video. In response to the operation, the terminal 100 may separately display the video. The original video is used as an example. After detecting a tap operation performed on the original video, the terminal 100 may play the original video separately, so that the user can browse the clearer original video with higher resolution.

Figure 3C:
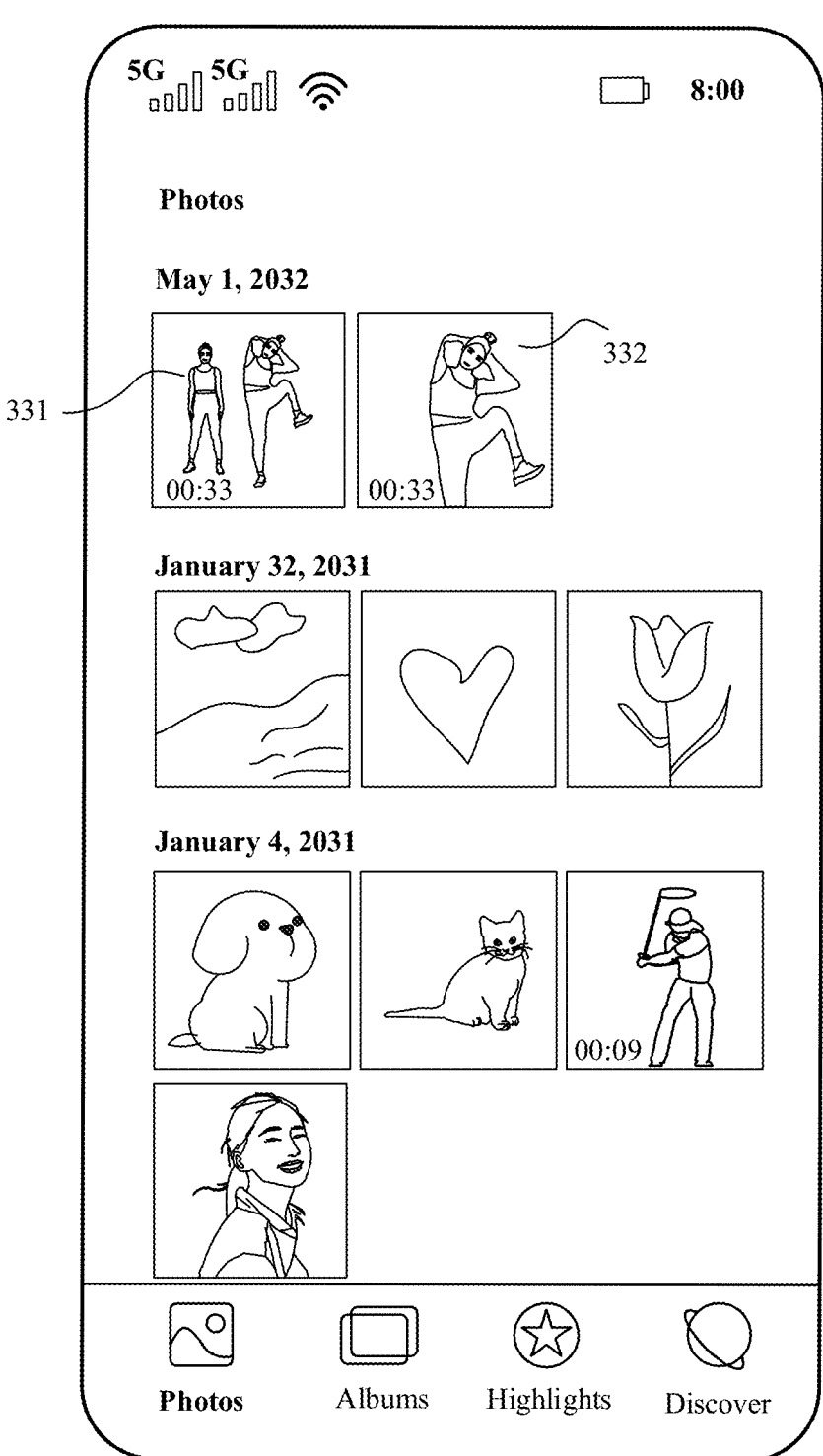

FIG. 3C shows an example of another user interface of a terminal 100 for displaying a locally saved video and/or picture.

In the user interface shown in FIG. 3C, the terminal 100 may display two thumbnail icons, for example, an icon 331 and an icon 332. The two thumbnail icons respectively correspond to the original video and the close-up video that are shot in the SOLO CUT mode. For example, the icon 331 may correspond to the original video, and the icon 332 may correspond to the close-up video. After detecting a user operation performed on the icon 331, the terminal 100 may display the original video. After detecting a user operation performed on the icon 332, the terminal 100 may display the close-up video.

The icon 331 and the icon 332 may include same image content, for example, the protagonist person 2 selected by the user. In this way, the user can intuitively and clearly determine, by using the image content displayed in the image, that the videos corresponding to the two icons are a group of videos shot in the SOLO CUT mode.

By implementing an auto-focus shooting method (the SOLO CUT mode) shown in FIG. 1A-FIG. 1J, and FIG. 2A-FIG. 2I, the terminal 100 may detect, in real time, the object in the raw image collected by the camera. The user may select, at any time, any one of one or more objects identified by the terminal 100 as a protagonist, or may switch the protagonist at any time.

Before recording is started, when an object set as a protagonist is lost for a period of time, the terminal 100 may cancel a protagonist status of the object, and then indicate the user to reselect a protagonist. In the recording process, the terminal 100 may pause recording when the object set as the protagonist is lost. When regaining the protagonist, the terminal 100 may continue recording. In this way, the user can obtain a coherent close-up video centered on the protagonist. In addition, the protagonist is not limited to one object.

After ending recording, the terminal 100 may simultaneously save both the original video and the close-up video. The original video may retain all image content collected by the camera in the recording process. The close-up video may focus on displaying video content of the protagonist selected by the user. The user may browse or use the original video or the close-up video based on different requirements, thereby providing the user with richer experience.

Figure 4:
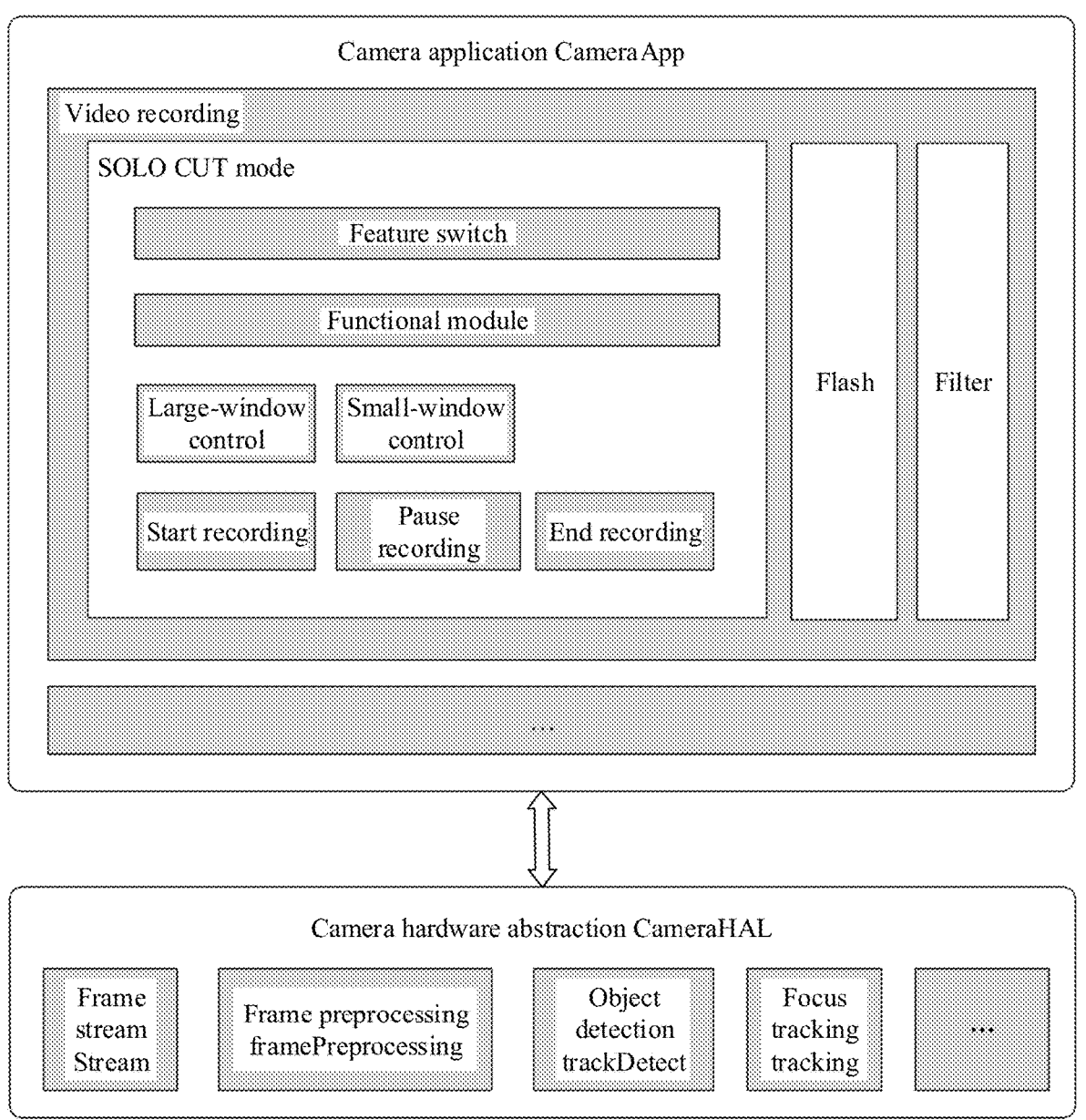
FIG. 4 is a schematic diagram of a system structure of a terminal 100 according to an embodiment of this application.

FIG. 4 is a schematic diagram of an example of a software structure of a terminal 100.

The schematic diagram of the software structure shown in FIG. 4 may include a camera application CameraApp and a camera hardware abstraction CameraHAL.

The terminal 100 may use a layered architecture. Layers communicate with each other by using a software interface. An Android system is used as an example, and the layered architecture separately includes an application layer, an application framework layer, an Android runtime (Android runtime) and system library, and a kernel layer from top to bottom.

The camera application may be disposed at the application layer. The application layer may include a series of application packages, for example, the camera application, a gallery application, and a phone application. This embodiment of this application mainly relates to the camera application.

The camera application may include one or more functional modules. One functional module corresponds to a camera service provided by the camera application. FIG. 4 shows a recording module. The recording module provides a recording service for the user. In addition, the camera application may further include other functional modules. With reference to the menu bar 111 shown in FIG. 1A, the other functional modules further include a shooting module (that provides a service for shooting a photo), a portrait module (that provides a service for shooting a portrait photo), a night module (that provides a service for shooting at night), and the like.

Referring to controls such as the flash 1151, the filter 1152, and the SOLO CUT mode 1154 shown in FIG. 1A, the recording module may include a flash module, a filter module, a SOLO CUT mode module, and the like. The flash module may be configured to control turning on or off of a flash. The filter module may be configured to control turning on or off of a filter and select a filter type. The SOLO CUT mode module is configured to control enabling of a shooting function of automatically focusing on a protagonist described in the foregoing user interface.

Further, the SOLO CUT mode module may include a feature switch module, a functional module, a large-window control module, a small-window control module, a start recording module, a pause recording module, and an end recording module.

The feature switch module records processing logic for enabling a SOLO CUT mode. The functional module records processing logic of a global shooting method in the SOLO CUT mode. The large-window control module records processing logic related to preview window display in the SOLO CUT mode. The small-window control module records processing logic related to small window display in the SOLO CUT mode. The start recording module records processing logic of starting recording in the SOLO CUT mode. The pause recording module records processing logic of pausing recording in the SOLO CUT mode. The end recording module records processing logic of ending recording in the SOLO CUT mode.

The camera hardware abstraction may be set in the system library. In this embodiment of this application, the camera hardware abstraction may include a frame stream module, a frame preprocessing module, an object detection module, and a focus tracking module.

The frame stream module may be configured to buffer an image frame stream collected by the camera. The frame preprocessing module may be configured to perform an image processing algorithm such as facial beautification, body beautification, and filter on an obtained image frame. The object detection module includes an object identification algorithm. The object detection module performs the object identification algorithm, and may identify one or more objects included in any frame of image. The focus tracking module includes a focusing algorithm. The focus tracking module executes the focusing algorithm, and may position a protagonist in a rear image frame, so that the camera application can provide an auto-focus shooting service for the protagonist.

Optionally, the functional module in the camera application may alternatively be disposed at the application framework layer or the system library, and the camera hardware abstraction may be alternatively disposed at the kernel layer or the like. The functional module in the camera application is located above the camera hardware abstraction. It may be understood that the software structure shown in FIG. 4 is only an optional example, and should not constitute a limitation on this application.

After the camera application is enabled, a camera mounted in the terminal 100 enters a working state, collects an optical signal, and generates an image indicated by a corresponding electrical signal. A generated image is first stored in a buffer (RAW-buffer) of the camera. The camera may then report a currently generated image frame to the CameraHAL in real time. The CameraHAL may process the received image frame and send a processed image frame to an area corresponding to a preview window on a screen for display. The image sent by the CameraHAL to the area corresponding to the preview window on the screen for display is the raw image in the embodiments of this application.

According to the shooting method in the SOLO CUT mode provided in this embodiment of this application, in a process of sending and displaying the raw image by the CameraHAL, the CameraHAL may further perform image identification and focus tracking on the raw image, to implement the shooting functions in the SOLO CUT mode shown in FIG. 1A-FIG. 1J, FIG. 2A-FIG. 2I, and FIG. 3A-FIG. 3C.

Figure 5A:
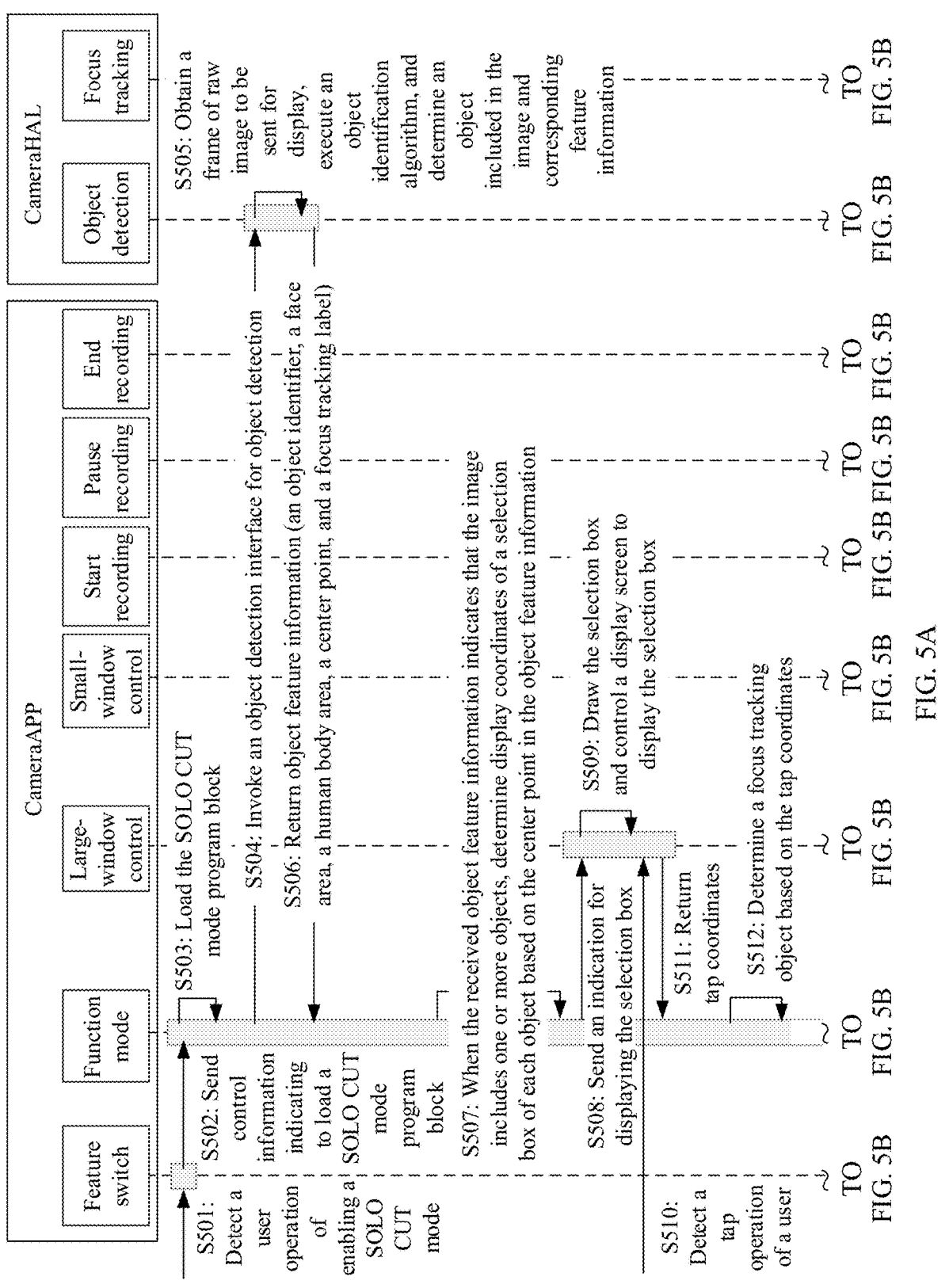
FIG. 5A and FIG. 5B are a flowchart of interaction between software modules of a terminal 100 according to an embodiment of this application.
Figure 5B:
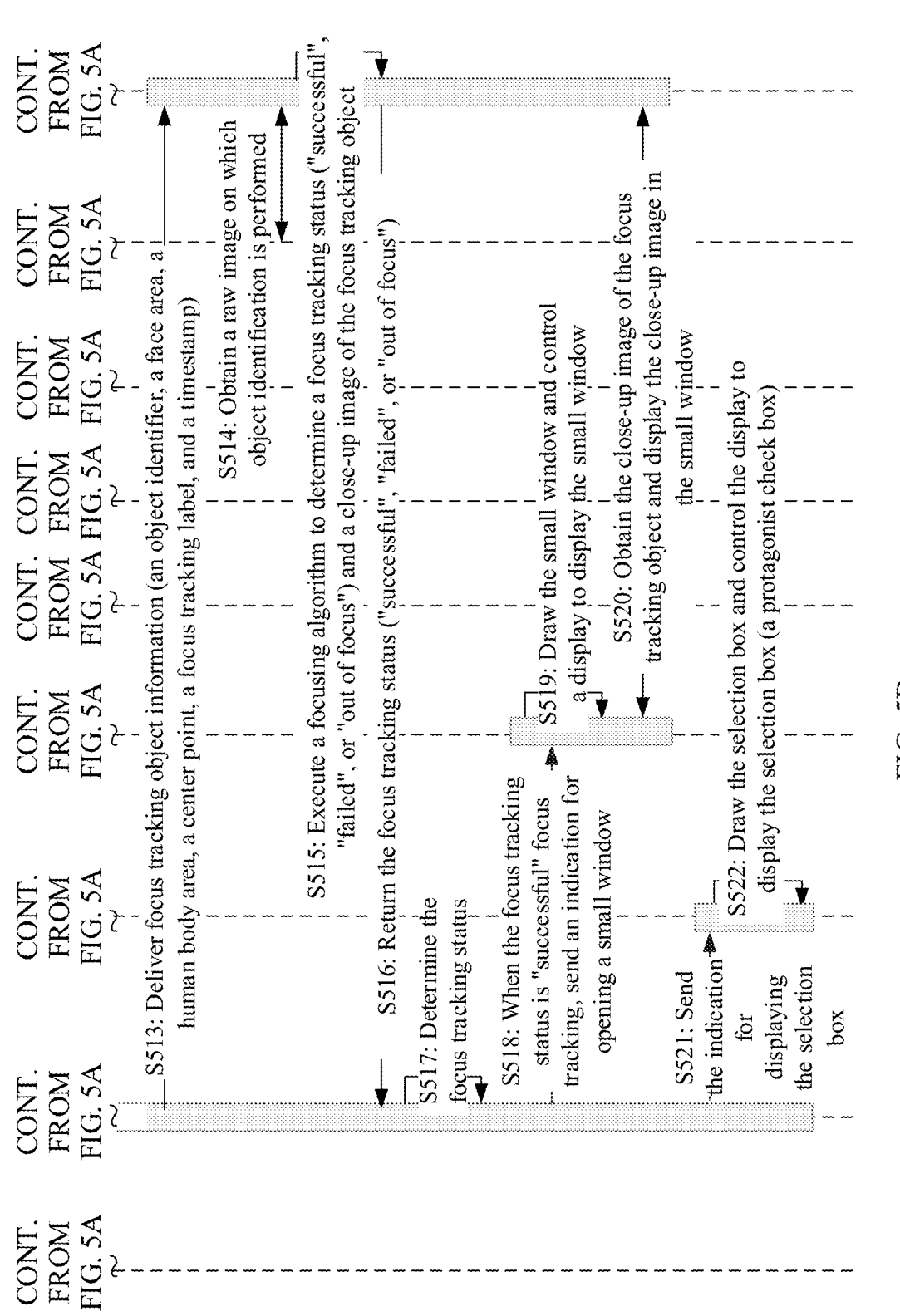

First, FIG. 5A and FIG. 5B are a flowchart of an example of selecting a protagonist and displaying a close-up image of the protagonist in a preview process shown in FIG. 1A-FIG. 1D.

S501: The feature switch module detects a user operation of enabling the SOLO CUT mode.

With reference to the user interface shown in FIG. 1A, in a scenario in which the camera is invoked for recording, the user may indicate, by using the operation performed on the SOLO CUT mode 1154, the terminal 100 to enable the SOLO CUT mode, to record the protagonist-centered close-up video and the original video by using the SOLO CUT mode. In the foregoing process, the feature switch module in the CameraApp may detect the user operation performed on the SOLO CUT mode 1154 for enabling the SOLO CUT mode.

After detecting the user operation of enabling the SOLO CUT mode, S502: The feature switch module may send, to the functional module, control information indicating to load a SOLO CUT mode program block. In response to the control information, S503: The functional module loads the SOLO CUT mode program block. The functional module may load the SOLO CUT mode program block stored in a memory into an internal memory. A processor may read program code in the foregoing program block from the internal memory, and execute the program code in sequence, to run the shooting method in the SOLO CUT mode provided in the embodiments of this application.

S504: The functional module invokes an object detection interface for object identification.

After an operation of loading the SOLO CUT mode program block is completed, in a process of executing the program code in the SOLO CUT mode, the functional module may first invoke the object detection interface (an object detection function) to perform the object identification. The object detection interface may be configured to invoke the object detection module in the CameraHAL to execute an object identification algorithm, to identify an object included in an image collected by the camera.

S505: The object detection module obtains a frame of raw image to be sent for display, executes the object identification algorithm, and determines an object included in the image and corresponding feature information.

In response to an invoking action shown in S504, the object detection module may obtain a current frame (a latest frame of image generated by the camera) from the RAW-buffer of the camera. Then, the object detection module may directly input the image frame into the object identification algorithm, identify and output an object in the frame of image and object feature information. The camera may continuously collect and generate images (a raw image stream), and the object detection module may continuously identify an object included in each image in the raw image stream.

The object feature information includes a quantity of objects and feature information of each object. Feature information of one object includes but is not limited to an object identifier (objectId), a face (face) area, a human body (body) area, a center (center) point, and a tracking label (isTracking) of the object.

The object identifier is used to uniquely identify an object. The face area is an image area of a face image of an object in a raw image. The human body area is an image area of a face image of an object in a raw image. The center point indicates coordinates of a center position of an object image. Optionally, the center point may be a center point of the human body area or a center point of the face area, or may indicate coordinates of a point determined based on the center point of the human body area and the center point of the face area. The tracking label is used to indicate whether an object is a protagonist. For example, isTracking=1 may indicate that an object is set as a tracking object (namely, a protagonist); and isTracking=0 may indicate that an object is not set as a tracking object. Initially, tracking labels are all labels (isTracking=0) that indicate not being tracked.

Figure 6:
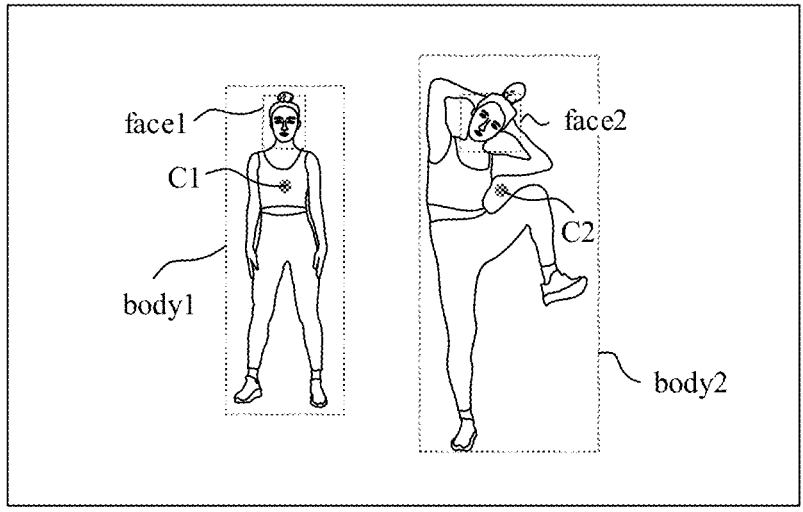
FIG. 6 is a schematic diagram of determining object feature information of a frame of image by a terminal 100 according to an embodiment of this application.

For example, for an image S1 shown in FIG. 6, the object identification algorithm is executed, and the object detection module may determine object feature information of S1. Refer to Table 1.

TABLE 1

| objectId | face | body | center | isTracking |
|----------|-------|-------|-----------|------------|
| 1 | Face1 | Body1 | C1(x1, y1) | 0 |
| 2 | Face2 | Body2 | C2(x2, y2) | 0 |

For example, for objectId=1, objectId=1 may indicate the person 1. Face1 may indicate a face area of the person 1. Body1 may indicate a human body area of the person 1. C1 may indicate a center point of an image of the person 1, and (x1, y1) is coordinates of the center point. isTracking=0 may indicate that the person 1 is not set as a focus tracking object.

In this embodiment of this application, the object identification algorithm is mainly an identification algorithm for objects such as a person, namely, a human body detection algorithm. In another implementation, the terminal 100 may further support focusing on objects such as a plant, an animal, and a building. In this case, the object identification algorithm further includes identification algorithms for identifying a specific plant, animal, and building. Details are not described herein.

In some embodiments, the terminal 100 may determine, by using the human body detection algorithm, one or more persons included in an image. In some embodiments, the terminal 100 may further determine, by using the human body detection algorithm and a face detection algorithm, one or more persons included in an image. When one human body image output by the human body detection algorithm matches one face image output by the face detection algorithm, the terminal 100 may determine one person. In a multi-person scenario, the foregoing method can reduce interference caused by image overlapping, and improve accuracy of person identification.

Optionally, when invoking the object detection interface, the functional module may further determine an address of the RAW-buffer, and then may send the address to the object detection module when invoking the object detection module for identification. Alternatively, after determining the address of the RAW-buffer, the functional module may obtain the image collected by the camera from the RAW-buffer, and then send the image to the object detection module. In this way, the object detection module can directly obtain the raw image from the functional module, or obtain the raw image based on the address transmitted by the functional module.

S506: The object detection module returns object feature information (an object identifier, a face area, a human body area, a center point, and a tracking label) to the functional module.

After the object detection module determines the object feature information in the raw image by using the object identification algorithm, the object detection module may return the feature information to the functional module. For example, the object detection module may return the object feature information shown in Table 1 to the functional module. In this way, the functional module can determine, based on the received object feature information, whether the latest frame of image (namely, a frame of image to be sent for display) reported by the camera includes one or more objects that may be used as a protagonist.

If the received object feature information indicates that the frame of image to be sent for display includes the one or more objects, the functional module may determine that the image to be sent for display includes the one or more objects. Further, the functional module may generate a mark (a selection box) corresponding to each object based on the center point in the feature information. On the contrary, if the received object feature information indicates that there is no object in the frame of image to be sent for display, the functional module may determine that there is no object in the image to be sent for display. Further, the functional module may determine that no mark needs to be generated. Subsequently, the user cannot select any object as a protagonist.

S507: When the received object feature information indicates that the image includes the one or more objects, the functional module determines display coordinates of the selection box of each object based on the center point in the object feature information.

After receiving the object feature information, the functional module may determine, based on the center point in the object feature information, selection boxes that match identified objects one by one, and determine the display coordinates of each selection box. A center point of the selection box is the center point of each object in the object feature information.

With reference to the user interface shown in FIG. 1B, when displaying the raw image collected by the camera, the terminal 100 further displays the selection box corresponding to each object in the raw image, for example, the selection boxes 121 and 122. Center points of the selection boxes are center points of the person 1 and the person 2 in the preview window 113 in FIG. 1B.

The person 1 (objectId=1) is used as an example. After receiving the object feature information of the person 1 shown in Table 1, the functional module may determine a center point C1 (x1, y1) of the person 1. Then, the functional module may generate the selection box 121 corresponding to the person 1. In the foregoing process, the functional module may determine display coordinates C_screen (X1, Y1) of the selection box 121 by using the center point C1 (x1, y1). Similarly, the functional module may determine display coordinates of a selection box of another object: display coordinates C_screen (X2, Y2) of the selection box 122.

S508: The functional module sends an indication for displaying the selection box to the large-window control module.

After determining the display coordinates of the selection box corresponding to each object in the image, the functional module may send control information for displaying the selection box to the large-window control module. The indication may carry the display coordinates of each selection box, for example, C_screen (X1, Y1) and C_screen (X2, Y2), so that the large-window control module determines a display location of each selection box on the screen.

S509: The large-window control module draws the selection box and controls a display screen to display the selection box.

After receiving the indication for displaying the selection box, the large-window control module may determine to draw and display the selection box. The large-window control module may draw the selection box corresponding to each object in the raw image by using the display coordinates carried in the control information. Then, the large-window control module may send display data of the drawn selection box to a display, to display each selection box on the screen.

Referring to the user interface shown in FIG. 1B, in this case, the terminal 100 may display the selection box corresponding to each object on each object in the image while displaying the image, to provide a function of selecting a protagonist for the user.

S510: The large-window control module detects a tap operation of the user.

The large-window control module may monitor the tap operation of the user. At a moment after the selection box is displayed, the large-window control module may detect an operation of tapping the screen by the user. The large-window control module may determine coordinates (tap coordinates) of the tap operation performed on the screen, for example, click_screen (X0, Y0).

With reference to the user interface shown in FIG. 1C, after displaying the selection boxes 121 and 122, the terminal 100 may detect a user operation performed on the selection box 122. It may be understood that, when detecting the tap operation, the large-window control module does not determine whether the tap operation is an operation of tapping the selection box. The large-window control module only needs to determine the coordinates of the tap operation on the screen.

S511: The large-window control module returns the tap coordinates to the functional module.

S512: The functional module determines a focus tracking object based on the tap coordinates.

After receiving the tap coordinates returned by the large-window control module, the functional module may first determine image coordinates corresponding to the tap coordinates, that is, determine a location of the tap operation on the image. Then, the functional module may determine, based on the image coordinates and the center point of each object, an object tapped by the user, that is, determine the focus tracking object (a protagonist).

For example, after receiving click_screen (X0, Y0), the functional module may determine image coordinates C (x0, y0) corresponding to the tap operation of the user based on click_screen (X0, Y0). Then, optionally, the functional module may calculate a distance between the image coordinates C (x0, y0) and each of the center points of the objects in the image: C1 (x1, y1) and C2 (x2, y2). The functional module may determine an object corresponding to a center point with a minimum distance as a focus tracking object.

For example, with reference to the user interface shown in FIG. 1C, the functional module may determine that a distance dis [C, C2] between C2 (x2, y2) and C (x0, y0) is minimum. In this case, the terminal 100 may determine that the person 2 (objectId=2) corresponding to C2 (x2, y2) is a focus tracking object, and the tap operation shown in S510 is an operation of tapping the selection box 122 of the person 2. In this case, the person 2 may be referred to as the focus tracking object or the protagonist. Subsequently, the functional module may update a tracking label of the person 2, for example, update original isTracking=0 to isTracking=1.

S513: The functional module delivers focus tracking object information (an object identifier, a face area, a human body area, a center point, a tracking label, and a timestamp) to the focus tracking module.

After determining the focus tracking object, the functional module may invoke a focus tracking interface. The focus tracking interface may be configured to invoke the focus tracking module in the CameraHAL to execute the focusing algorithm, to identify whether a subsequent raw image stream includes a focus tracking object (the protagonist) selected by the user.

When invoking the focus tracking interface, the functional module may send feature information of the focus tracking object selected by the user to the focus tracking module. For example, the focus tracking object is the person 2, and feature information of the person 2 sent by the functional module may be, for example, face=Face2, body=Face2, center=C2, isTracking=1, and objectId=2. The feature information is used by the focus tracking module to position the person 2 in a next image collected by the camera, that is, to position the protagonist selected by the user.

In addition, the functional module further sends a timestamp to the focus tracking module. The timestamp is a timestamp of invoking the focus tracking interface by the functional module. The timestamp may be used to determine that the focusing algorithm is executed starting from which frame of image collected by the camera.

In a scenario in which selecting a plurality of protagonists is supported, the large-window control module may detect a plurality of user operations of tapping selection boxes, and the functional module may determine a plurality of focus tracking objects based on the plurality of tap operations, and then deliver the plurality of focus tracking objects to the focus tracking module.

S514: The focus tracking module obtains, from the object detection module, a raw image on which object detection is performed.

After receiving the focus tracking object information, the focus tracking module may first obtain a to-be-focused image, that is, a frame of raw image to be sent for display that is collected by the camera. The focus tracking module may obtain the to-be-focused image from the object detection module.

In some embodiments, only one frame of raw image on which object identification is performed is stored in a buffer of the object detection module. In this case, the focus tracking module may directly obtain the image frame currently stored in the buffer from the buffer. The currently stored image frame is the to-be-focused image.

In some other embodiments, the buffer of the object detection module may store a plurality of frames of raw images on which object identification is performed. The last frame in the buffer is the to-be-focused image. In this case, if a timestamp of a moment of focusing on the object is not delivered, the focus tracking module may obtain an image frame that has been sent for display. Consequently, a raw image displayed in the preview window does not match a close-up image of a protagonist displayed in the small window. In view of this, the functional module may further send a current timestamp when delivering the feature information of the focus tracking object. The focus tracking module may obtain the to-be-focused image from the buffer based on the timestamp from the functional module, to avoid a problem of image mismatch.

When the raw image on which object detection is performed is obtained from the object detection module, in addition to obtaining image data, the focus tracking module may further obtain the object feature information corresponding to the image, to subsequently determine the focus tracking object in the image.

S515: The focus tracking module executes a focusing algorithm to determine a focus tracking status ("successful", "failed", or "out of focus") and a close-up image of the focus tracking object.

The focus tracking module may execute the focusing algorithm after receiving the feature information of the focus tracking object and determining a to-be-focused image. By using the focusing algorithm, the focus tracking module may confirm whether the to-be-focused image includes the focus tracking object indicated by the feature information. If the to-be-focused image includes the focus tracking object indicated by the feature information, the focus tracking module may determine that the focus tracking status is "successful". On the contrary, the focus tracking module may determine that the focus tracking status is "failed". In a "successful" case, the focus tracking module may further generate a close-up image centered on the focus tracking object.

For example, an ith frame of image collected by the camera is the to-be-focused image, and after S514, the focus tracking module may obtain the ith frame of image and object feature information corresponding to the ith frame of image. Then, the focus tracking module may calculate a similarity between each object in the ith frame of image and the focus tracking object delivered in S513. An object in the ith frame of image that has a highest similarity with the delivered focus tracking object, where the highest similarity is higher than a threshold, may be determined as a focus tracking object in the ith frame of image.

For example, when the focus tracking module obtains the ith frame of image from the object detection module, the focus tracking module may further obtain feature information of each object in the ith frame of image. Refer to Table 2.

TABLE 2

| objectId | face | body | center | isTracking |
|---|---|---|---|---|
| i1 | Face_i1 | Body_i1 | C_i1 | 0 |
| i2 | Face_i2 | Body_i2 | C_i2 | 0 |

Then, the focus tracking module may separately calculate a similarity between the focus tracking object (Table 1: objectId=2) and each of objects (objectId=i1 and objectId=i2) in the ith frame of image. For example, the focus tracking module may determine that the similarity between objectId=i2 and objectId=2 is highest and is higher than a preset threshold. In this case, the focus tracking module may determine that an object corresponding to objectId=i2 is the focus tracking object in the ith frame of image.

When the ith frame of image matches the focus tracking object, the focus tracking module may determine that a tracking status of the current frame is "successful"; otherwise, the focus tracking module may determine that the tracking status of the current frame is "failed". In addition, because the video stream is generated in real time, after the tracking status of the ith frame of image is determined, the focus tracking module may continue to determine a focus tracking status of an (i+1)th frame, and return the focus tracking status of the (i+1)th frame to the functional module. When the status of the ith frame of image is "successful", if the (i+1)th frame of image matches the focus tracking object, the focus tracking module may determine that the tracking status of the (i+1)th frame of image is "successful". If the (i+1)th frame of image does not match the focus tracking object, the focus tracking module may determine that the tracking status of the (i+1)th frame of image is "out of focus".

In addition, after determining that the object corresponding to objectId=i2 is the focus tracking object in the ith frame of image, the focus tracking module may set isTracking corresponding to objectId=i2 to 1, which indicates that the object is the focus tracking object. In addition, the focus tracking module may further determine the close-up image based on the focus tracking object, so that the CameraAPP subsequently obtains and displays the close-up image.

In some embodiments, a specific process in which the focus tracking module calculates the similarity between each object in the ith frame of image and the delivered focus tracking object is as follows: First, the focus tracking module may determine, based on a quantity of objects and an image area of each object (for example, the human body box body 1 in FIG. 6) that are output by the object detection module, whether persons in the ith frame of image overlap.

In a non-overlapping scenario, the terminal 100 may determine the focus tracking object in the ith frame of image by using an intersection over union IoU between the image area of each object and an image area of the delivered focus tracking object. An image area of an object may be indicated by using the human body area in the object feature information, that is, the focus tracking module may perform protagonist focus tracking by using the IoU of the human body area in the ith frame of image. An object in the ith frame of image that has a largest IoU with the delivered focus tracking object may be determined as the focus tracking object in the ith frame of image.

In an overlapping scenario, the terminal 100 may determine the focus tracking object in the ith frame of image by using an intersection over union IoU between image areas of the objects and a similarity of image content. An object in the ith frame of image that has a maximum sum of the IoU and the similarity of the image content with the delivered focus tracking object may be determined as the focus tracking object in the ith frame of image.

S516: The focus tracking module returns the focus tracking status ("successful", "failed", or "out of focus") to the functional module.

After determining the focus tracking status, the focus tracking module may first return the focus tracking status to the functional module. A focus tracking status of a frame of image may be any one of "successful", "failed", and "out of focus". Each time a focus tracking status of a frame of image is determined, the focus tracking module may return the focus tracking status of the frame of image to the functional module. A "successful" focus tracking status received by the functional module may be referred to as a focus tracking success indication. An "out-of-focus" focus tracking status may be referred to as an out-of-focus indication.

S517: The functional module determines the focus tracking status. After receiving the focus tracking status returned by the focus tracking module in the CameraHAL, the functional module may confirm that the focus tracking status is "successful", "failed", or "out of focus".

S518: When the focus tracking status is "successful" focus tracking, the functional module sends an indication for opening the small window to the small-window control module.

S519: The small-window control module draws the small window and controls the display to display the small window.

In response to the indication for enabling the small window, the small-window control module may draw the small window, for example, the small window 141 shown in FIG. 1D. Then, the small-window control module may send an image of the drawn small window to the display. After receiving the image of the small window, the display displays the small window at a location corresponding to the display.

S520: The small-window control module obtains the close-up image of the focus tracking object from the focus tracking module, and displays the close-up image in the small window.

Referring to the descriptions in S515, in the "successful" case, the focus tracking module may further generate the close-up image centered on the focus tracking object. Specifically, the small-window control module may obtain the close-up image by using a session (session) that is provided by the focus tracking module for reading the close-up image, to display the close-up image of the focus tracking object in the small window. The session is a segment of storage space that is in the focus tracking module and that is used to store a close-up image.

For example, when a sending and displaying period arrives, the CameraAPP may receive the ith frame of image reported by the CameraHAL and a close-up image of a protagonist corresponding to the ith frame of image. In this case, the large-window control module in the CameraAPP may display the ith frame of image in the preview window, and the small-window control module in the CameraAPP may display the close-up image of the protagonist in the drawn small window.

S521: The functional module sends the indication for displaying the selection box to the large-window control module.

When the focus tracking status is "successful" focus tracking, the functional module may further send an indication for displaying an object mark (a selection box and/or a check box) to the large-window control module. A mark of the focus tracking object (the protagonist) is the check box, and a mark of a non-protagonist is the selection box. The control information may carry display coordinates of each object mark. It may be understood that S518 and S521 are not in a sequence, and both are operations performed by the functional module after S517.

S522: The large-window control module draws the selection box and controls the display to display the selection box.

After receiving the indication for displaying the selection box, the large-window control module may determine to draw and display the selection box. Based on the display coordinates, the large-window control module may determine a specific display location of each selection box on the screen. In this case, the large-window control module may further confirm, based on object feature information (isTracking) of the ith frame of image, whether there is a focus tracking object in the image and which is specifically the focus tracking object. The large-window control module may then determine a type of a selection box: a selection box indicating unselected (the selection box 122), or a selection box indicating selected (the check box 142).

For example, based on the object feature information (isTracking) of the ith frame of image shown in Table 2, the large-window control module may determine that the person 2 corresponds to the selection box indicating selected (the check box), and the person 1 corresponds to the selection box indicating unselected. In this case, the large-window control module may draw different types of selection boxes, so that the user can conveniently distinguish between the protagonist and the non-protagonist.

In S517, if the focus tracking status received by the functional module is "failed", the functional module does not perform any action. The terminal 100 continues to display, according to the foregoing described method, an image collected by the camera, identifies an object in the image, displays a selection box corresponding to each object, and waits for a user operation of selecting a protagonist. Optionally, if the focus tracking status received by the functional module is "failed", the functional module may alternatively indicate the large-window control module to display a prompt of a focus tracking failure in the preview window, and indicate the user to re-select a protagonist.

Figure 7:
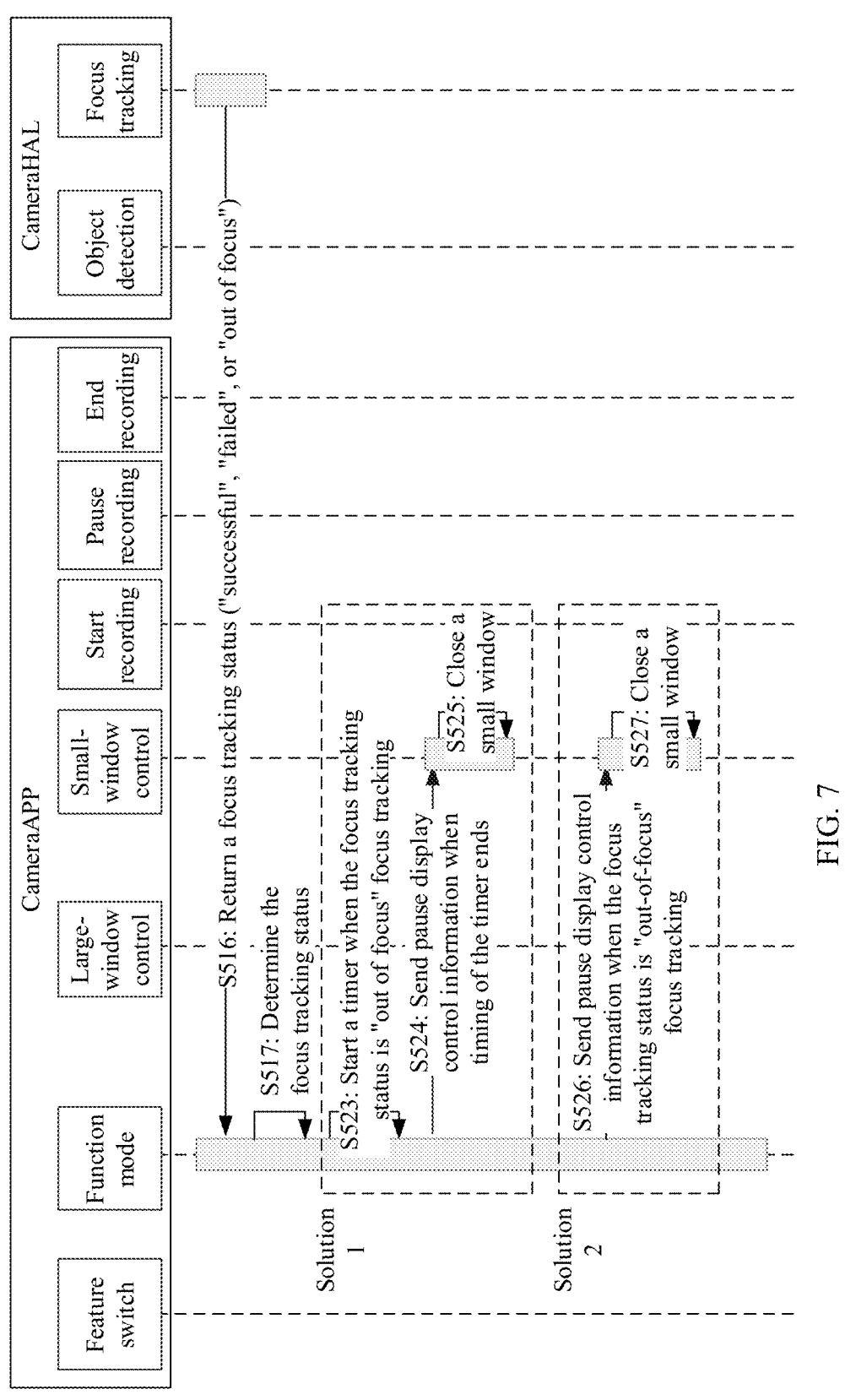
FIG. 7 is another flowchart of interaction between software modules of a terminal 100 according to an embodiment of this application.

On a basis of "successful" focus tracking, if the focus tracking module does not identify the focus tracking object in a frame, the focus tracking module may return the focus tracking status of out-of-focus to the functional module, and control the small window to pause display of the close-up image or even close the small window. FIG. 7 is a flowchart of an example of out-of-focus in a preview process shown in FIG. 1I-FIG. 1J.

In a preview scenario (in which recording is not started), S523: When the focus tracking status is "out-of-focus" focus tracking, the functional module starts a timer.

Referring to the descriptions in FIG. 1I-FIG. 1J, and FIG. 2E-FIG. 2F in a subsequent video recording process, when it is first detected that the focus tracking object is lost, the small window 141 may immediately pause the small window, or may wait for a period of time to pause the small window. In a waiting process, the small window may display an image cropped based on a location of the last frame of close-up image in the raw image, or may directly display the raw image zoomed in an equal proportion.

A method for waiting for the period of time to pause the small window is used as an example. When the focus tracking status received by the functional module is "out of focus", the functional module may start the timer. When starting the timer, the functional module may set timing duration of the timer. With reference to the descriptions of the user interface shown in FIG. 1I, a timing length of the timer may be 5 seconds.

In the method for waiting for the period of time to pause the small window, after determining that the focus tracking status is "out of focus", the focus tracking module may continue to crop, in a manner of cropping the last frame before loss, subsequent several frames of raw images, to obtain an image sent for display in the small window. Correspondingly, the small-window control module may continue to obtain, from the session provided by the focus tracking module, the image sent for display in the small window, and then display the image. It may be understood that in this case, image content sent for display in the small window does not include the foregoing set protagonist.

S524: When timing of the timer ends, the functional module sends pause display control information to the small-window control module.

The timing duration of 5 seconds is used as an example. When timing of the timer ends and the focus tracking status returned by the CameraHAL is still "out of focus", the functional module may send control information for closing the small window to the small-window control module.

In this case, if the focus tracking status returned by the CameraHAL is "successful", the focus tracking module may store a close-up image of the focus tracking object in the session. Correspondingly, the small-window control module may obtain the close-up image from the session. In this case, the user can see a new close-up image in the small window. When the focus tracking status returned by the CameraHAL is "successful", the functional module may close the timer whose timing does not end.

Referring to the descriptions in FIG. 2E-FIG. 2F, in a scenario in which recording is started, when timing of the timer ends and the focus tracking status returned by the CameraHAL is still "out of focus", the functional module may send pause recording control information to the small-window control module, without directly closing the small window. This is described in detail in subsequent embodiments.

S525: The small-window control module controls to close the small window.

In response to the foregoing control information for closing the small window, the small-window control module may close the small window, and stop obtaining the close-up image from the session. Referring to the user interface shown in FIG. 1J, the small window 141 is not displayed in the preview window 113.

Optionally, in a preview scenario, S526: When the focus tracking status is "out-of-focus" focus tracking, the functional module sends pause display control information to the small-window control module.

A method for immediately pausing the small window is used as an example. When the focus tracking status received by the functional module is "out of focus", the functional module may immediately send close control information to the small-window control module, without setting a timer or sending control information for closing the small window after waiting for ending of timing of the timer.

S527: The small-window control module controls to close the small window. This is same as S525. Details are not described herein.

Figure 8:
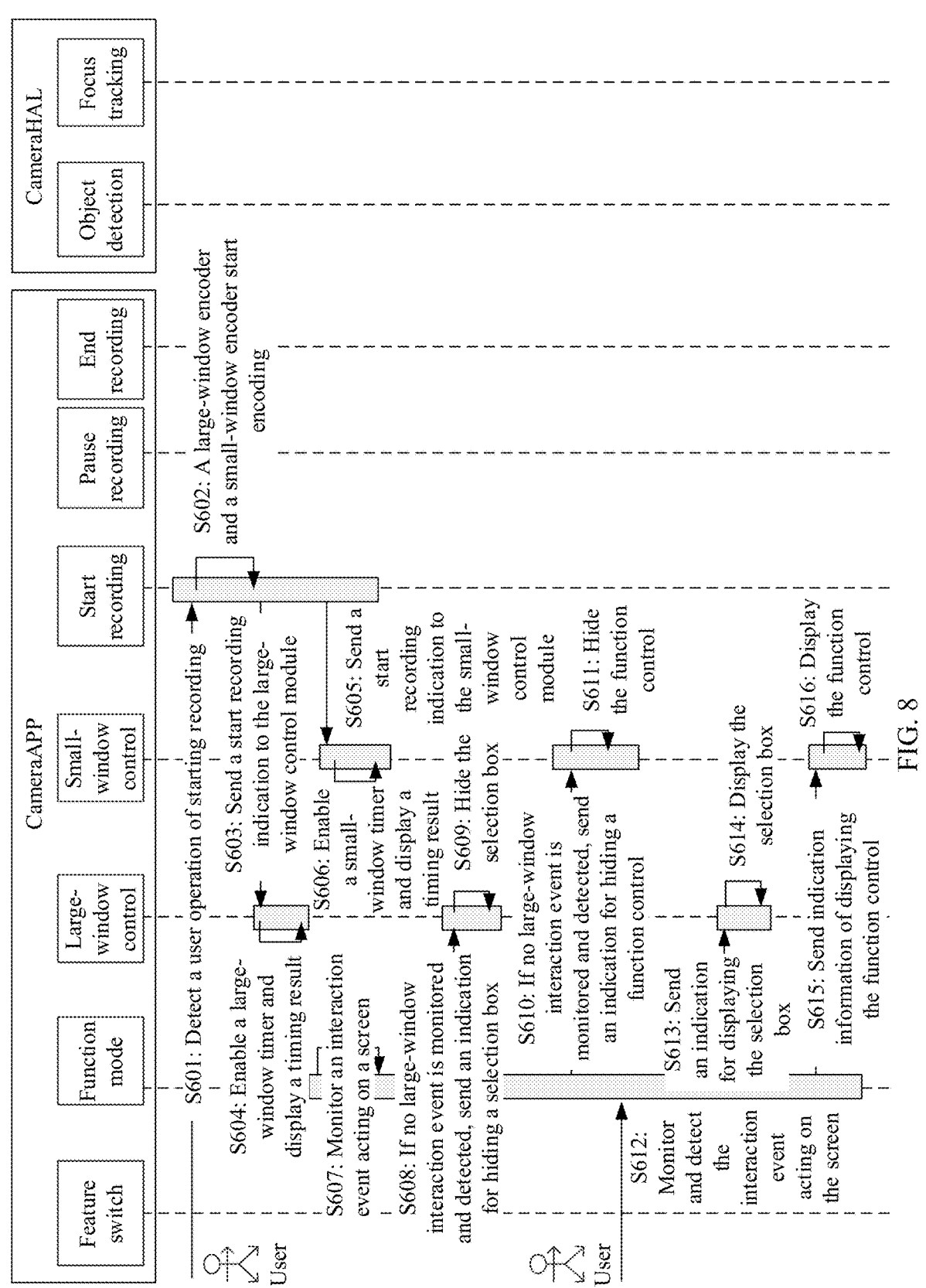
FIG. 8 is another flowchart of interaction between software modules of a terminal 100 according to an embodiment of this application.

FIG. 8 is a flowchart of an example of a start recording process shown in FIG. 2A-FIG. 2B.

S601: The start recording module detects a user operation of starting recording.

In the preview process, after determining the focus tracking object, the user may enable video recording by using a shooting control. Referring to the user interface shown in FIG. 2A, the terminal 100 may detect the user operation performed on the shooting control 112. In response to the operation, the terminal 100 may start recording a video. Specifically, the start recording module in the CameraAPP may detect the user operation of starting recording.

S602: The start recording module controls a large-window encoder and a small-window encoder to start encoding.

After detecting the user operation of starting recording, the start recording module may enable the large-window encoder and the small-window encoder, and control the large-window encoder and the small-window encoder to start encoding the image sent for display. The large-window encoder is configured to encode an image stream in a large window (the preview window 113). The small-window encoder is configured to encode an image stream in the small window (the small window 141).

S603: The start recording module sends a start recording indication to the large-window control module. In response to the indication, S604: The large-window control module enables a large-window timer and displays a timing result.

A preview window view in a recording process may include a time mark for recording duration of the preview window. After receiving the foregoing start recording indication information, the large-window control module may initialize the large-window timer and start timing. In addition, the large-window control module may display the timing result of the timer in the preview window. The timing result displayed in the large window is the time mark for recording the recording duration of the preview window. Referring to the user interface shown in FIG. 2B, recording duration "00:01" is displayed in the upper left corner of the preview window 113. The recording duration "00:01" is a current timing result of the large-window timer.

S605: The start recording module sends start recording indication information to the small-window control module. Similarly, after enabling the small-window encoder, the start recording module may further send start recording indication information to the small-window control module. It may be understood that there is no sequential relationship between S603-S604 and S605-S606.

In response to the foregoing indication, S606: The small-window control module enables a small-window timer and displays a timing result.

A small-window view in the recording process may include a time mark for recording duration of the small window. After receiving the start recording indication information, the small-window control module may initialize the small-window timer and start timing. In addition, the small-window control module may display the timing result of the timer in the small window. The timing result displayed in the small window is the time mark for recording the recording duration of the small window. Referring to the user interface shown in FIG. 2B, recording duration "00:01" is displayed in the upper left corner of the small window 141. The recording duration "00:01" is a current timing result of the small-window timer.

S607: The functional module monitors an interaction event acting on the screen.

After detecting the user operation of starting recording, the functional module may monitor, in real time, an interaction control event acting on the screen, for example, a tap operation or a slide operation.

S608: When an interaction event acting on a large-window area on the screen is not monitored and detected within a preset time, the functional module sends indication information of hiding a selection box to the large-window control module.

For example, the preset time is 5 seconds. When the interaction event acting on the large-window area on the screen is not monitored and detected within consecutive 5 seconds, the functional module may send the indication information of hiding a selection box to the large-window control module. The foregoing 5 seconds is an example of monitoring duration. The functional module may alternatively set other monitoring duration. The monitoring duration may be referred to as first duration. The functional module may time the first duration by using a first timer.

After receiving the indication information of hiding a selection box, S609: The large-window control module hides the selection box.

S610: An interaction event acting on a small-window area on the screen is not monitored and detected within a preset time, and the functional module delivers indication information of hiding a function control to the small-window control module.

Similarly, 5 seconds is used as an example. When the interaction event acting on the small-window area on the screen is not monitored and detected within consecutive 5 seconds, the functional module may send the indication information of hiding a function control to the small-window control module. The function control includes the recording duration, a stop control, and the like displayed in the small window, to reduce blocking of the image displayed in the small window and improve user browsing experience.

S611: The small-window control module hides the function control.

After receiving the indication information of hiding a function control, the small-window control module may stop displaying the function control such as the recording duration and the stop control. Similarly, there is no sequential relationship between S608-S609 and S610-S611.

S612: The functional module monitors and detects the interaction event acting on the screen.

At a moment after the selection box is hidden, the functional module may monitor and detect the interaction event acting on the screen, for example, a user operation of tapping any location on the screen. Herein, the interaction event acting on the screen includes an interaction event acting on the preview window and an interaction event acting on the small window.

After monitoring and detecting the interaction event acting on the screen, S613: The functional module sends an indication for displaying a selection box to the large-window control module. In response to the indication, S614: The large-window control module may display the selection box. In this way, the user can select or switch the focus tracking object by using the selection box.

After monitoring and detecting the interaction event acting on the screen, S615: The functional module sends indication information of displaying the function control to the small-window control module. In response to the indication, S616: The small-window control module displays the function control. For example, the function control includes recording duration, a pause control, and a stop control in the small window 141. In this way, the user may control to pause or stop recording the small window by using the functional module.

Optionally, the functional module may separately monitor an interaction event acting on the large-window area on the screen and an interaction event acting on the small window. When monitoring and detecting the interaction event acting on the large-window area on the screen, the functional module may indicate the large-window control module to display the selection box. When monitoring and detecting the interaction event acting on the small-window area on the screen, the functional module may indicate the small-window control module to display the function control.

Figure 9A:
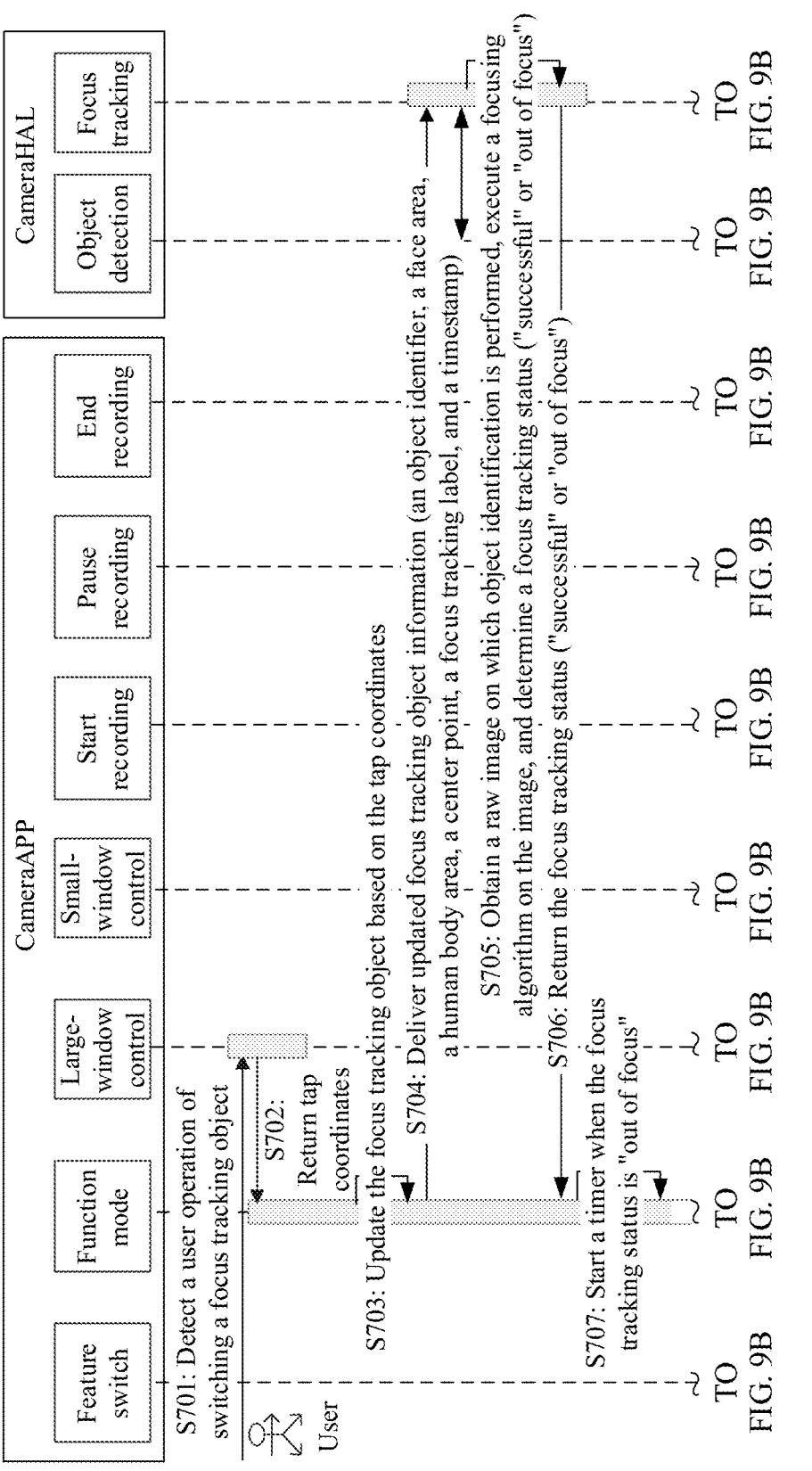
FIG. 9A and FIG. 9B are another flowchart of interaction between software modules of a terminal 100 according to an embodiment of this application.
Figure 9B:
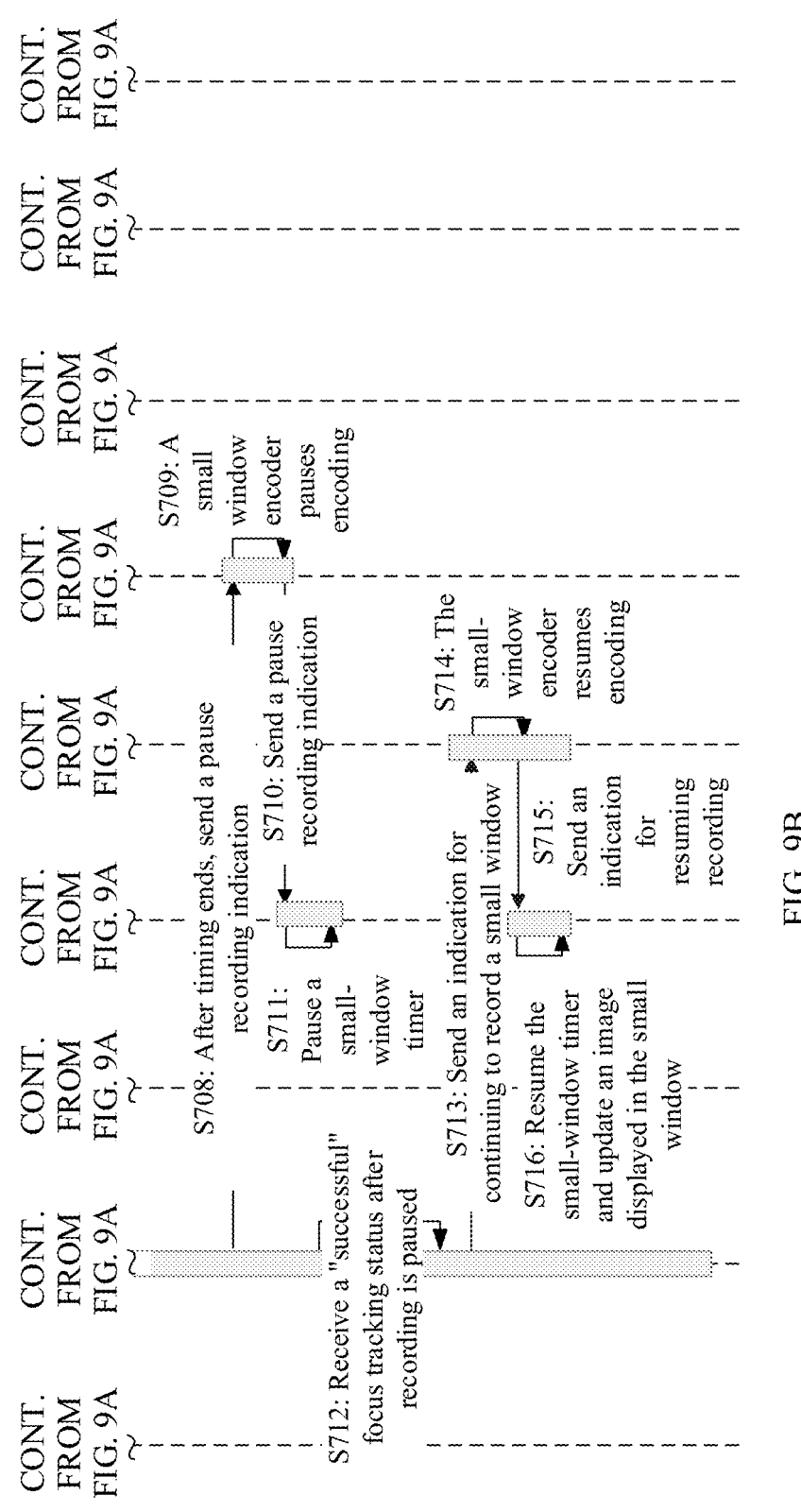

FIG. 9A and FIG. 9B are a flowchart of an example of a protagonist switching process shown in FIG. 2C-FIG. 2D.

S701: The large-window control module detects a user operation of switching the focus tracking object.

In a recording process, the user may switch the focus tracking object at any time. For example, referring to the user interface shown in FIG. 2C, the terminal 100 may detect a user operation performed on the selection box 121 for switching the focus tracking object to the person 1. Specifically, the large-window control module in the CameraAPP may detect the user operation of switching the focus tracking object.

S702: The large-window control module returns tap coordinates to the functional module.

Referring to step S511, when detecting a user operation of tapping a selection box to switch the focus tracking object, the large-window control module also first determines coordinates (the tap coordinates) of the tap operation performed on the screen. Then, the large-window control module may return the tap coordinates to the functional module.

S703: The functional module updates the focus tracking object based on the tap coordinates.

Referring to step S512, after receiving the tap coordinates returned by the large-window control module, the functional module may first determine image coordinates corresponding to the tap coordinates. In a process of switching the focus tracking object, the functional module may determine, based on the image coordinates and the center point of each object, an object tapped by the user, to determine a new focus tracking object (a protagonist). With reference to the user interface shown in FIG. 2C, in this case, the terminal 100 may set the person 1 as the new focus tracking object (the protagonist).

After the focus tracking object is updated, the functional module may adaptively modify object feature information of a corresponding image. For example, the functional module may modify the tracking label of the person 2 being the previous focus tracking object to 0 (isTracking=0), and further modify a tracking label of the person 1 being the new focus tracking object to 1 (isTracking=1).

S704: The functional module delivers updated focus tracking object information (a face, a body, a center, isTracking, objectId, and a timestamp) to the focus tracking module.

After determining the new focus tracking object, the functional module may invoke the focus tracking interface to input feature information of the new focus tracking object to the focus tracking module, for example, the feature information of the person 1: face=Face1, body=Face1, center=C1, isTracking=1, and objectId=1, so that the focus tracking module positions the new focus tracking object in the raw image stream, and generates a close-up image of the new focus tracking object. Referring to step S513, similarly, the functional module further sends a current timestamp to the focus tracking module, so that the focus tracking module positions the new focus tracking object from which frame in the raw image stream.

S705: The focus tracking module obtains, from the object detection module, a raw image on which object identification is performed, executes the focusing algorithm on the image, and determines a focus tracking status ("successful" or "out of focus").

Referring to the descriptions in S514-S515, the focus tracking module may determine, based on the timestamp, to start to position the first frame of image of the new focus tracking object. For example, the timestamp may indicate to start to focus on the new protagonist person 1 from a kth frame of image. In this case, the focus tracking module may obtain, from the object detection module, the kth frame of image on which object identification is performed, and then determine a focus tracking status of the image frame: "successful" or "out of focus".

The kth frame of image is used as an example. When obtaining the kth frame of image from the object detection module, the focus tracking module may further obtain feature information of each object in the kth frame of image. Referring to step S515, the focus tracking module may then position the focus tracking object in the kth frame of image based on the delivered feature information of the focus tracking object and the feature information of each object in the kth frame of image. Details are not described herein again. Similarly, after positioning the focus tracking object in the kth frame of image, the focus tracking module may further determine a close-up image based on the focus tracking object, so that the CameraAPP subsequently obtains and displays the close-up image.

S706: The focus tracking module returns the focus tracking status ("successful" or "out of focus") to the functional module.

After determining the focus tracking status, the focus tracking module may first return the focus tracking status to the functional module.

When the focus tracking module positions the new focus tracking object in the kth frame of image, the focus tracking status of the kth frame of image returned by the focus tracking module is "successful". When the focus tracking module does not position the new focus tracking object in the kth frame of image, the focus tracking status of the kth frame of image returned by the focus tracking module is "out of focus".

The small-window control module periodically obtains, from the session provided by the focus tracking module, the image sent for display in the small window. When the focus tracking status is "successful", the functional module does not need to make any change. In this case, the close-up image in the session of the focus tracking module is replaced with the close-up image of the new focus tracking object based on the focusing algorithm. Therefore, the image obtained by the small-window control module from the session is also correspondingly the close-up image of the new focus tracking object.

S707: When the focus tracking status is "out of focus", the functional module starts a timer.

When the focus tracking status is "out of focus", the functional module may start the timer. Referring to the descriptions in S523, when starting the timer, the functional module may set timing duration of the timer. The timing duration of the timer is, for example, 5 seconds. The timing duration may be referred to as second duration. The timer may be referred to as a second timer.

S708: After timing ends, the functional module sends a pause recording indication to the pause recording module. While setting the timer, or after setting the timer, the functional module may further send the pause recording indication to the pause recording module. S709: The pause recording module controls the small-window encoder to pause encoding. In response to the indication, the small-window encoder in the pause recording module may pause encoding.

S710: The pause recording module sends the pause recording indication to the small-window control module. After pausing the small-window encoder, the pause recording module may further send a pause display indication to the small-window control module. S711: The small-window control module pauses the small-window timer. After receiving the pause display indication, the small-window control module may stop timing of the small-window timer. In this case, the timestamp in the small window may stop at a final timing result before out-of-focus, for example, "00:05". In addition, after receiving the pause display indication, the small-window control module may pause obtaining and displaying of the new close-up image from the session. In this case, the close-up image displayed in the small window may stop at the image being currently displayed.

S712: After pausing recording, the functional module receives a "successful" focus tracking status.

After pausing recording, the functional module may receive a frame that is returned by the focus tracking module and whose focus tracking status is "successful". In this case, the small-window control module may obtain the close-up image of the new focus tracking object from the session. Therefore, the small window can continue to display the new close-up image. Correspondingly, S713: The functional module may send an indication for continuing to record the small window to the start recording module. In response to the indication, S714: The small-window encoder resumes encoding. The small-window encoder may continue to encode an image stream in the small window (the small window 141).

In addition, S715: The start recording module may send an indication for resuming recording to the small-window control module. In response to the indication, S716: The small-window control module resumes the small-window timer and continues to display the close-up image. The small-window control module may restart the small-window timer and re-display current timing of the small-window timer in the small window. In addition, the small-window control module may continue to obtain and display the close-up image of the focus tracking object from the session.

Figure 10:
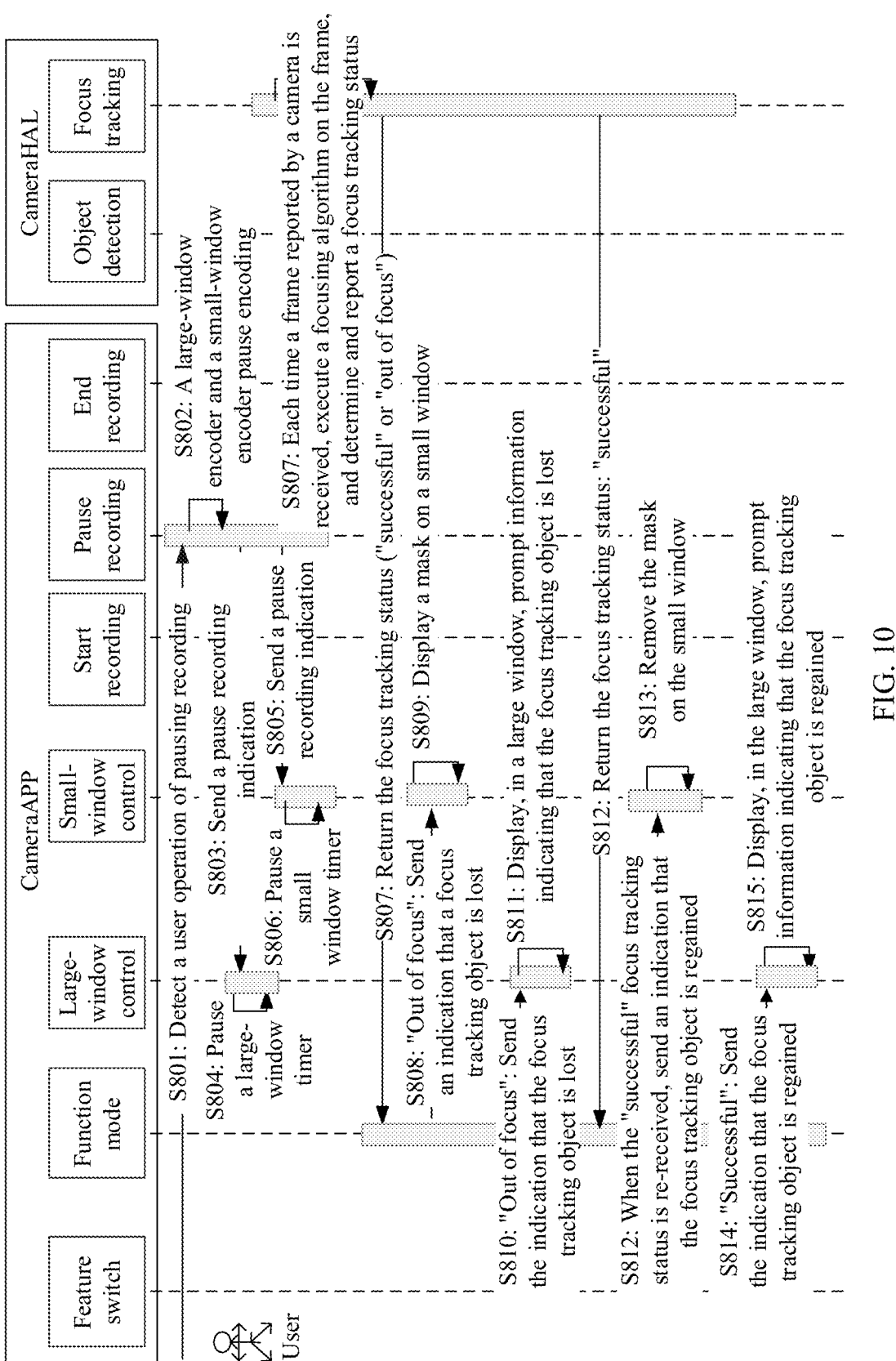
FIG. 10 is another flowchart of interaction between software modules of a terminal 100 according to an embodiment of this application.

FIG. 10 is a flowchart of an example of a pause recording process.

S801: The pause recording module detects a user operation of pausing recording.

After starting to record a video, the user may pause video recording by using the shooting control. For example, referring to the user interface shown in FIG. 2B, the pause control 2111 may be used to pause video recording. When detecting a user operation performed on the pause control 2111, the terminal 100 may confirm that the user operation of pausing recording is detected.

In response to the user operation, S802: The pause recording module may control the large-window encoder and the small-window encoder to stop encoding. In addition, S803: The pause recording module may send a pause recording indication to the large-window control module. In response to the indication, S804: The large-window control module may pause the large-window timer. In this case, the timestamp in the large window may stop at a current timing moment. The user may determine, based on the foregoing timing moment no longer increasing, that large-window recording is paused.

In addition, S805: The pause recording module may further send a pause recording indication to the small-window control module. In response to the indication, S806: The small-window control module may pause the small-window timer. In this case, the timestamp in the small window may stop at a current timing moment. The user may determine, based on the foregoing timing moment no longer increasing, that small-window recording is paused. There is no sequential relationship between S803-S804 and S805-S808. In addition, from a user perspective, the large-window timer and the small-window timer simultaneously stop timing.

S807: The focus tracking module returns a focus tracking status to the functional module.

In a process of pausing recording of a video, the camera may still collect and generate an image, and then successively report generated image frames to the CameraHAL after generating the image. Correspondingly, each time receiving a frame reported by the camera, the focus tracking module executes the focusing algorithm on the frame, determines whether each image frame includes the focus tracking object, further determines a focus tracking status, and returns the focus tracking status to the functional module.

In the recording process, S808: In a case that recording is paused in both the large window and the small window, when the returned focus tracking status is "out of focus", the functional module may send an indication that the focus tracking object is lost to the small-window control module. In response to the indication, S809: The small-window control module controls the small window to display a mask.

In the recording process, S810: In a case that recording is paused in both the large window and the small window, when the returned focus tracking status is "out of focus", the functional module may further send an indication that the focus tracking object is lost to the large-window control module. In response to the indication, S811: The large-window control module may control the large window to display prompt information indicating that the focus tracking object is lost. Similarly, there is no sequential relationship between S808 and S810.

In an out-of-focus scenario, when the focus tracking module re-positions the focus tracking object in a frame of image, the focus tracking module may determine that a focus tracking status of the frame of image is "successful", and return the focus tracking status to the functional module. S812: When re-receiving the "successful" focus tracking status, the functional module sends an indication that the focus tracking object is regained to the small-window control module. In response to the indication, S813: The small-window control module eliminates the mask on the small window.

In addition, S814: When re-receiving the "successful" focus tracking status, the functional module further sends an indication that the focus tracking object is regained to the large-window control module. In response to the indication, S815: The large-window control module displays, in the large window, prompt information indicating that the focus tracking object is regained.

It may be understood that in the procedure shown in FIG. 9A and FIG. 9B, in an out-of-focus state, the functional module may control to pause recording of the image in the small window. With reference to the descriptions in S808-S809, the functional module also sends the indication that the focus tracking object is lost to the small-window control module, so that the small window correspondingly displays the mask. In a state of recovering after out-of-focus, the functional module may resume recording the image in the small window. With reference to the descriptions in S812-S813, the functional module also sends the indication that the focus tracking object is regained to the small-window control module, to eliminate the mask displayed on the small window.

Figure 11:
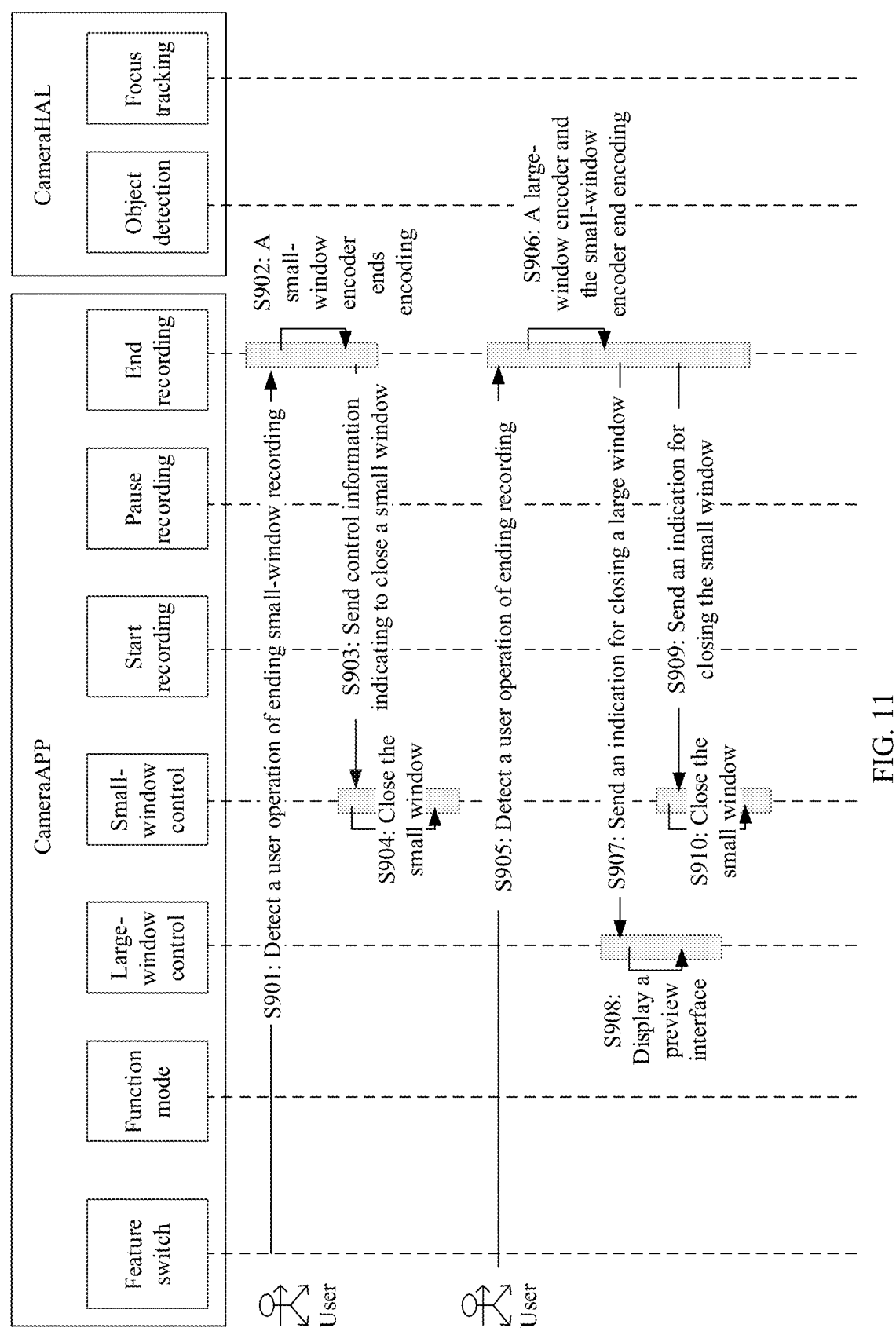
FIG. 11 is another flowchart of interaction between software modules of a terminal 100 according to an embodiment of this application.

FIG. 11 is a flowchart of an example of an end recording process shown in FIG. 2H-FIG. 2I.

In the video recording process, the user may first choose to close the small window to end recording the close-up video. In addition, the user may alternatively close the large window to simultaneously end recording the original video and the close-up video.

S901: The end recording module detects a user operation of ending small-window recording. Referring to the stop control 212 described in FIG. 2B, the terminal 100 may detect a user operation performed on the control. The user operation is the user operation of ending small-window recording.

In response to the user operation of ending small-window recording, S902: The end recording module may control to close the small-window encoder and control the small-window encoder to stop encoding the close-up image sent for display in the small window. The small-window encoder may encapsulate an encoded close-up image into a video, namely, the close-up video.

After detecting the user operation of ending small-window recording, S903: The end recording module may further send an indication for closing the small window to the small-window control module. In response to the indication, S904: The small-window control module may close the small window.

S905: The end recording module detects a user operation of ending recording. Referring to the user interface shown in FIG. 2H, the terminal 100 may further detect a user operation performed on the control 2112. The user operation is the user operation of ending recording. The operation of ending recording corresponds to simultaneously ending large-window recording and small-window recording.

In response to the user operation of ending recording, S906: The end recording module may control to close the large-window encoder and the small-window encoder, and stop encoding images sent for display in the large window and the small window. The small-window encoder may encapsulate an encoded close-up image into a video, namely, the close-up video. Simultaneously, the large-window encoder may encapsulate an encoded raw image as a video, namely, the original video.

After detecting the user operation of ending recording, S907: The end recording module sends an indication for closing the large window to the large-window control module. After receiving the indication for closing the large window, S908: The large-window control module displays a preview interface before video recording is started. The large-window control module may display the preview interface.

In addition, S909: The end recording module sends an indication for closing the small window to the small-window control module. After receiving the indication for closing the small window, S910: The small-window control module closes the small window. In this case, the terminal 100 may display the user interface shown in FIG. 1A: the preview interface without the small window. Similarly, there is no sequential relationship between S907 and S909.

In the embodiments of this application:

The object identified by the object detection module from the image collected by the camera may be referred to as a first object, for example, the person 1 and the person 2 shown in FIG. 1B. One or more first objects may be included in one frame of image collected by the camera. The object selected as the focus tracking object (the protagonist) from the objects identified by the object detection module may be referred to as a second object, for example, the person 2 determined by the user as the protagonist shown in FIG. 1D.

After the focus tracking object is determined, a window used to display the close-up image of the focus tracking object may be referred to as a first window, for example, the small window 141 that displays the person 2 (the focus tracking object) and that is shown in FIG. 1D. The original video obtained by recording the raw image in the preview window 113 is the first video. The close-up video obtained by recording the close-up image in the small window 141 is the second video.

Referring to FIG. 8, the large-window encoder enabled by the start recording module may be referred to as a first encoder, and the small-window encoder may be referred to as a second encoder.

Figure 12:
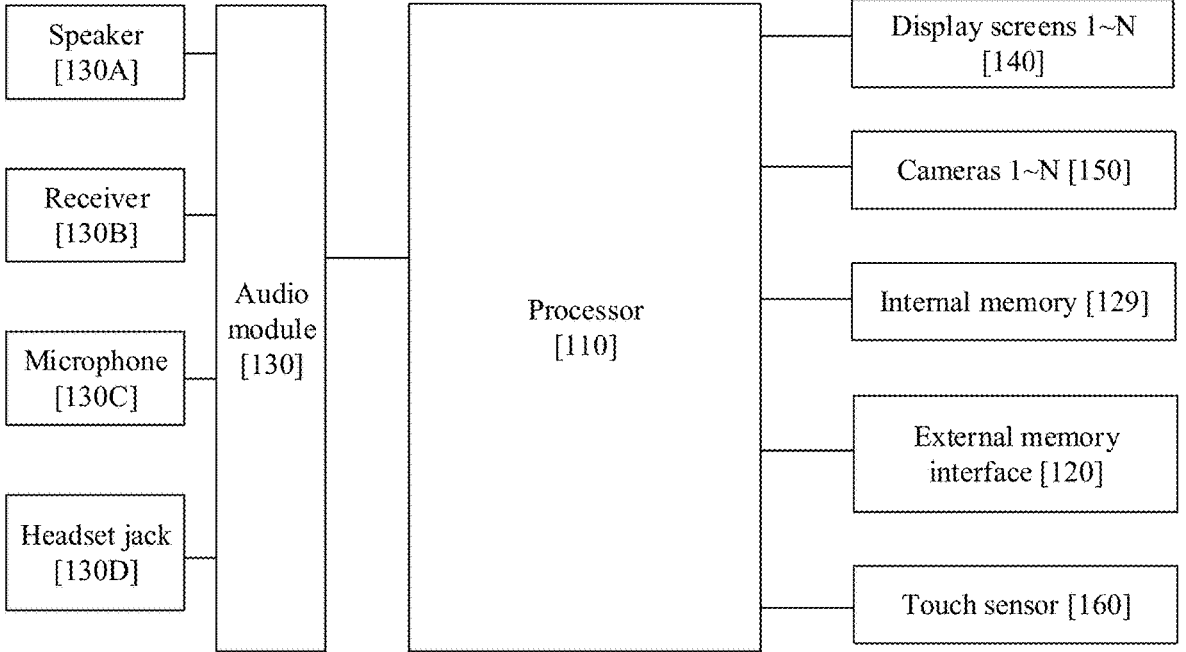
FIG. 12 is a schematic diagram of a hardware structure of a terminal 100 according to an embodiment of this application.

FIG. 12 is a schematic diagram of a hardware structure of a terminal 100 according to an embodiment of this application.

The terminal 100 may include a processor 110, an external memory interface 120, an internal memory 129, an audio module 130, a speaker 130A, a receiver 130B, a microphone 130C, a headset jack 130D, a display screen 140, a camera 150, and a touch sensor 160.

The structure shown in this embodiment of the present invention does not constitute a specific limitation on the terminal 100. In some other embodiments of this application, the terminal 100 may include more or fewer components than shown in the figure, or combine some components, or split some components, or have different component arrangements. The components shown in the figure may be implemented by using hardware, software, or a combination of software and hardware. An interface connection relationship among the modules shown in this embodiment of the present invention is merely an example for description, and does not constitute a limitation on the structure of the terminal 100.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). A memory may be further disposed in the processor 110, and is configured to store instructions and data.

The terminal 100 implements a display function by using the GPU, the display screen 140, the application processor, and the like.

The GPU is a microprocessor for image processing, and is connected to the display screen 140 and the application processor. The GPU is configured to perform mathematical and geometric computing for graphics rendering. The processor 110 may include one or more GPUs, and the one or more GPUs execute program instructions to generate or change displayed information. The display screen 140 is configured to display an image, a video, or the like. In some embodiments, the electronic device may include one or N display screens 140, where N is a positive integer greater than 1.

In this embodiment of this application, a capability of displaying, by the terminal 100, the raw image collected by the camera, the close-up image of the protagonist determined through focus tracking, and the user interfaces shown in FIG. 1A-FIG. 1J, FIG. 2A-FIG. 2I, and FIG. 3A-FIG. 3C relies on the display function provided by the GPU, the display screen 140, and the application processor.

The terminal 100 may implement a shooting function by using the ISP, the camera 150, the video codec, the GPU, the display screen 140, the application processor, and the like.

The camera 150 is configured to capture a still image or a video. The ISP is configured to process data fed back by the camera 150. Light is transmitted to a camera photosensitive element through a lens. An optical signal is converted into an electrical signal. The camera photosensitive element transmits the electrical signal to the ISP for processing, to convert the electrical signal into an image visible to naked eyes. The terminal 100 may include one or N cameras 150, where N is a positive integer greater than 1. The video codec is configured to compress or decompress a digital video. The terminal 100 may support one or more types of video codecs. Therefore, the terminal 100 may play or record videos in a plurality of encoding formats, such as moving picture experts group (moving picture experts group, MPEG) 1, MPEG2, MPEG3, and MPEG4.

In this embodiment of this application, that the terminal 100 implements the shooting method provided in the embodiments of this application first relies on an image collected by the ISP and the camera 150, and then relies on an image computing processing capability provided by the video codec and the GPU.

The internal memory 129 may include one or more random access memories (random access memory, RAM) and one or more non-volatile memories (non-volatile memory, NVM). The processor 110 may directly perform reading from or writing into the random access memory. The random access memory may be configured to store an executable program (for example, a machine instruction) of an operating system or another running program, and may be further configured to store data of a user and data of an application, and the like. The non-volatile memory may also store the executable program, the data of the user, and the data of the application, and the like, which may be loaded into the random access memory in advance for directly reading and writing by the processor 110.

In this embodiment of this application, code for implementing the shooting method described in the embodiments of this application may be stored in the non-volatile memory. When running a camera application, the terminal 100 may load the executable code stored in the non-volatile memory into the random access memory.

The external memory interface 120 may be configured to connect to an external non-volatile memory, to expand a storage capability of the terminal 100.

The terminal 100 may implement an audio function by using the audio module 130, the speaker 130A, the receiver 130B, the microphone 130C, the headset jack 130D, the application processor, and the like.

The audio module 130 is configured to convert digital audio information into an analog audio signal for output, and is also configured to convert an analog audio input into a digital audio signal. The speaker 130A, also referred to as a "loudspeaker", is configured to convert an audio electrical signal into a sound signal. The receiver 130B, also referred to as an "earpiece", is configured to convert an audio electrical signal into a sound signal. The microphone 130C, also referred to as a "mic" or "mike", is configured to convert a sound signal into an electrical signal. The headset jack 130D is configured to connect a wired headset.

In this embodiment of this application, in a process in which the camera is enabled to collect an image, the terminal 100 may simultaneously enable the microphone 130C to collect a sound signal, and convert the sound signal into an electrical signal for storage. In this way, the user can obtain an audio video.

The touch sensor 160 is also referred to as a "touch device". The touch sensor 160 may be disposed on the display screen 140. The touch sensor 160 and the display screen 140 form a touchscreen, which is also referred to as a "touch control screen". The touch sensor 160 is configured to detect a touch operation performed on or near the touch sensor 160. The touch sensor may transmit a detected touch operation to the application processor to determine a type of a touch event. A visual output related to the touch operation may be provided by using the display screen 140. In some other embodiments, the touch sensor 160 may be disposed on a surface of the terminal 100, and is located at a location different from that of the display screen 140.

In this embodiment of this application, the terminal 100 may detect, by using the touch sensor 160, the tap operation, the slide operation, and another operation performed on the display screen 140 by the user, to implement the shooting method shown in FIG. 1A-FIG. 1J, FIG. 2A-FIG. 2I, and FIG. 3A-FIG. 3C.

A term "user interface (user interface, UI)" in the specification, claims, and accompanying drawings of this application is a medium interface for interaction and information exchange between an application or an operating system and a user, and the medium interface implements conversion between an internal form of information and a form acceptable to the user. A user interface of an application is source code written in a specific computer language such as java or an extensible markup language (extensible markup language, XML). The source code of the interface is parsed and rendered on a terminal device, and is finally presented as user-identifiable content, for example, a control such as a picture, text, or a button. The control (control) is also referred to as a widget (widget), and is a basic element of the user interface. Typical controls include a toolbar (toolbar), a menu bar (menu bar), a text box (text box), a button (button), a scrollbar (scrollbar), a picture, and text. An attribute and content of the control in the interface are defined by using a label or a node. For example, the control included in the interface is defined in the XML by using a node such as <Textview>, <ImgView>, or <VideoView>. One node corresponds to one control or attribute in the interface. After being parsed and rendered, the node is presented as user-visible content. In addition, interfaces of many applications, such as a hybrid application (hybrid application), usually further include a web page. The web page, also referred to as a page, may be understood as a special control embedded in an application interface. The web page is source code written in a specific computer language, for example, a hyper text markup language (hyper text markup language, GTML), a cascading style sheet (cascading style sheets, CSS), or a javascript (JavaScript, JS). The source code of the web page may be loaded and displayed as user-identifiable content by a browser or a web page display component with a function similar to that of the browser. Specific content included in the web page is also defined by using a label or a node in the source code of the web page. For example, an element and an attribute of the web page are defined in the GTML by using <p>, <img>, <video>, and <canvas>.

The user interface is usually in a representation form of a graphical user interface (graphic user interface, GUI), and the graphical user interface is a user interface that is related to a computer operation and that is displayed in a graphical manner. The graphical user interface may be an interface element such as an icon, a window, or a control that is displayed on a display screen of an electronic device. The control may include visible interface elements such as an icon, a button, a menu, a tab, a text box, a dialog box, a status bar, a navigation bar, and a Widget.

The singular expression forms "one", "one type of", "the", "the foregoing", "this", and "the one" used in the specification and the appended claims of this application are also intended to include plural expression forms, unless otherwise specified in the context clearly. It should be further understood that the term "and/or" used in this application indicates and includes any or all possible combinations of one or more listed items. As used in the foregoing embodiments, according to the context, the term "when" may be interpreted as "if", "after", "in response to determining", or "in response to detecting". Similarly, based on the context, the phrase "when determining" or "if detecting (a stated condition or event)" may be interpreted as a meaning of "if determining", "in response to determining", "when detecting (a stated condition or event)", or "in response to detecting (a stated condition or event)".

All or some of the foregoing embodiments may be implemented by using software, hardware, firmware, or any combination thereof. When the software is used for implementation, some or all of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired manner (for example, a coaxial cable, an optical fiber, or a digital subscriber line) or a wireless manner (for example, infrared, wireless, or microwave). The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the procedures in the methods in the foregoing embodiments may be implemented by using a computer program instructing related hardware. The program may be stored in a computer-readable storage medium. When the program is executed, the procedures in the foregoing method embodiments may be performed. The foregoing storage medium includes any medium that can store program code, for example, a ROM, a random access memory RAM, a magnetic disk, or an optical disc.

The invention claimed is:

1. A shooting method, applied to an electronic device having a camera and a screen, wherein the method comprises:

displaying a preview window on the screen, and displaying, in the preview window, an image collected by the camera, wherein the image displayed in the preview window comprises one or more first objects, and the one or more first objects comprise a second object and a third object;

selecting the second object from the one or more first objects;

further displaying a first window while displaying the preview window on the screen, wherein an image displayed in the first window comprises the second object and does not comprise the third object;

selecting the third object from the one or more first objects, wherein an image displayed in the first window comprises the third object and does not comprise the second object while displaying the preview window on the screen;

and recording the image in the preview window, saving the image as a first video, recording the image in the first window, and saving the image as a second video, wherein the recording the image in the first window comprises:

pausing the recording of the image in the first window when it is detected that the image collected by the camera does not comprise the selected second object or the selected third object.

2. The method according to claim 1, wherein the selecting a second object from the one or more first objects comprise displaying one or more selection boxes on the one or more first objects; and determining, in response to a user operation performed on a first selection box, the first object corresponding to the first selection box as the second object.

3. The method according to claim 2, wherein a recording control is further displayed on the screen, and after the first window is displayed on the screen, the method further comprises: receiving a recording operation of a user corresponding to the recording control, and starting recording the first video and the second video simultaneously, wherein a start recording moment of the first video is the same as a start recording moment of the second video.

4. The method according to claim 2, wherein a recording control is further displayed on the screen, and before the selecting the second object from the one or more first objects, the method further comprises: receiving a recording operation of a user corresponding to the recording control, and starting recording the first video; and starting recording the second video while displaying the first window, wherein a start recording moment of the second video is later than a start recording moment of the first video.

5. The method according to claim 4, wherein an end recording moment of the first video is the same as an end recording moment of the second video; or an end recording moment of the second video is earlier than an end recording moment of the first video.

6. The method according to claim 5, wherein the pausing the recording of the image in the first window comprises: pausing the recording of the image in the first window when it is detected that the image collected by the camera does not comprise the second object and duration of this case is longer than second duration.

7. The method according to claim 6, wherein the method further comprises: resuming recording the image in the first window when it is detected that the image collected by the camera comprises the second object.

8. The method according to claim 7, wherein the first window and the preview window are displayed in a split-screen manner, or the first window is displayed on the preview window but does not completely cover the preview window.

9. The method according to claim 8, wherein the image that comprises the second object and that is displayed in the first window is cropped based on the image displayed in the preview window.

10. The method according to claim 2, wherein the electronic device comprises a functional module, an object detection module, and a large-window control module, and the displaying a selection box on the one or more first objects comprise:

identifying, by the object detection module, the one or more first objects from the image collected by the camera;

sending, by the object detection module, feature information of the one or more first objects to the functional module, wherein the feature information comprises a center point indicating a location of the first object, and one first object corresponds to one group of feature information;

determining, by the functional module, display coordinates based on the center point in the feature information; and displaying, by the large-window control module, the selection box corresponding to the one or more first objects on the screen based on the display coordinates.

11. The method according to claim 9, wherein the electronic device comprises a functional module, a focus tracking module, and a small-window control module, and the displaying a first window comprises:

sending, by the functional module, feature information of the second object to the focus tracking module;

determining, by the focus tracking module based on the feature information of the second object, whether an image to be sent for display comprises the second object; and sending, by the focus tracking module, a focus tracking success indication to the functional module when the second object is comprised; and controlling, by the functional module based on the focus tracking success indication, the small-window control module to display the first window on the screen.

12. The method according to claim 11, wherein the method further comprises: when the second object is comprised, cropping, by the focus tracking module, the image displayed in the first window from the image to be sent for display.

13. The method according to claim 3, wherein the electronic device comprises a start recording module, and the receiving a recording operation of a user corresponding to the recording control and starting recording the first video and the second video simultaneously comprises:

receiving, by the start recording module, the recording operation of the user corresponding to the recording control; and enabling, by the start recording module, a first encoder and a second encoder in response to the recording operation, starting, by the first encoder, encoding the image in the preview window, and starting, by the second encoder, encoding the image in the first window.

14. The method according to claim 13, wherein the electronic device comprises a focus tracking module, a functional module, and a pause recording module, and the pausing recording of the image in the first window when it is detected that the image collected by the camera does not comprise the second object and duration is longer than second duration comprises:

sending, by the focus tracking module, an out-of-focus indication to the functional module when it is identified that an image to be sent for display does not comprise the second object, and setting, by the functional module, a second timer based on the out-of-focus indication, wherein timing duration of the second timer is the second duration; and controlling, by the pause recording module, the second encoder to pause encoding of the image displayed in the first window when timing of the second timer ends and the functional module still does not receive a focus tracking success indication.

15. The method according to claim 13, wherein the electronic device comprises a focus tracking module, a functional module, and a start recording module, and the resuming recording the image in the first window when it is detected that the image collected by the camera comprises the second object comprises:

sending, by the focus tracking module, a focus tracking success indication to the functional module when it is identified that an image to be sent for display comprises the second object;

sending, by the functional module, a resume recording indication to the start recording module based on the focus tracking success indication; and re-enabling, by the start recording module, the second encoder based on the resume recording indication, to continue to encode the image displayed in the first window.

16. The method according to claim 2, wherein after the displaying a selection box on the one or more first objects, the method further comprises that the selection box disappears when no user operation performed on the screen is detected in first duration.

17. The method according to claim 16, wherein the electronic device comprises a functional module and a large-window control module, and that the selection box disappears when no user operation performed on the screen is detected in first duration comprises:

setting, by the functional module, a first timer after the selection box is displayed, wherein timing duration of the first timer is the first duration; and cancelling, by the large-window control module, the selection box after timing of the first timer ends and the functional module detects no user operation performed on the screen.

18. The method according to claim 17, wherein the selecting the second object from the one or more first objects; further displaying a first window while displaying the preview window on the screen comprises:

detecting a tap operation of a user;

determining a focus tracking object as the second object based on tap coordinates of the tap operation, wherein a tracking object information of the focus tracking object comprises an object identifier, a face area, a human body area, a center point, a tracking label, and a timestamp;

determining a focus tracking status of the focus tracking object, wherein focus tracking status comprises successful, failed, or out of focus;

when the focus tracking status is successful focus tracking, displaying the first window while displaying the preview window on the screen.

19. An electronic device, comprising one or more processors and one or more memories, wherein the one or more memories are coupled to the one or more processors, the one or more memories are configured to store computer program code, the computer program code comprises computer instructions, and when the one or more processors execute the computer instructions, the electronic device performs the following operations:

displaying a preview window on a screen, and displaying, in the preview window, an image collected by a camera, wherein the image displayed in the preview window comprises one or more first objects, the one or more first objects comprise a second object and a third object;

selecting the second object from the one or more first objects;

further displaying a first window while displaying the preview window on the screen, wherein an image displayed in the first window comprises the second object and does not comprise the third object;

selecting the third object from the one or more first objects, wherein an image displayed in the first window comprises the third object and does not comprise the second object while displaying the preview window on the screen; and recording the image in the preview window, saving the image as a first video, recording the image in the first window, and saving the image as a second video, wherein the recording the image in the first window comprises:

pausing the recording of the image in the first window when it is detected that the image collected by the camera does not comprise the selected second object or the selected third object.

20. A non-transitory computer-readable storage medium, comprising instructions, wherein when the instructions are run on an electronic device, the electronic device performs the following operations:

displaying a preview window on a screen, and displaying, in the preview window, an image collected by a camera, wherein the image displayed in the preview window comprises one or more first objects, the one or more first objects comprise a second object and a third object;

selecting the second object from the one or more first objects;

further displaying a first window while displaying the preview window on the screen, wherein an image displayed in the first window comprises the second object and does not comprise the third object;

selecting the third object from the one or more first objects, wherein an image displayed in the first window comprises the third object and does not comprise the second object while displaying the preview window on the screen; and recording the image in the preview window, saving the image as a first video, recording the image in the first window, and saving the image as a second video, wherein the recording the image in the first window comprises:

pausing the recording of the image in the first window when it is detected that the image collected by the camera does not comprise the second object or the third object.

* * * * *